United States Patent
Glendinning et al.

(10) Patent No.: US 8,321,548 B2
(45) Date of Patent: Nov. 27, 2012

(54) METHOD AND SYSTEM FOR SPECIFYING PLANNED CHANGES TO A COMMUNICATIONS NETWORK

(75) Inventors: Graham Glendinning, Bradford-on-Avon (GB); David Barton, Bath (GB); Paul McCluskey, Arlington, VA (US)

(73) Assignee: Amdocs Software Systems Limited, Dublin 3 (IE)

( * ) Notice: Subject to any disclaimer, the term of this patent is extended or adjusted under 35 U.S.C. 154(b) by 284 days.

(21) Appl. No.: 12/412,103

(22) Filed: Mar. 26, 2009

(65) Prior Publication Data

US 2010/0211662 A1 Aug. 19, 2010

(30) Foreign Application Priority Data

Feb. 13, 2009 (GB) .................................. 0902405.0

(51) Int. Cl.
*G06F 15/177* (2006.01)
*G06F 15/173* (2006.01)
*G06F 15/16* (2006.01)
*H04L 12/28* (2006.01)

(52) U.S. Cl. ........ 709/223; 709/220; 709/221; 709/246; 370/254

(58) Field of Classification Search .................. 709/220, 709/221, 223, 246; 370/254
See application file for complete search history.

(56) References Cited

U.S. PATENT DOCUMENTS

| | | | |
|---|---|---|---|
| 5,754,831 A | 5/1998 | Berman | 395/500 |
| 5,845,081 A * | 12/1998 | Rangarajan et al. | 709/224 |
| 6,208,955 B1 * | 3/2001 | Provan et al. | 703/20 |
| 2003/0101251 A1 | 5/2003 | Low | 709/223 |
| 2005/0213514 A1 * | 9/2005 | Su et al. | 370/254 |
| 2006/0047618 A1 | 3/2006 | Bannach | 707/1 |
| 2006/0253561 A1 * | 11/2006 | Holmeide et al. | 709/223 |
| 2007/0014248 A1 * | 1/2007 | Fowlow | 370/254 |
| 2007/0038939 A1 * | 2/2007 | Challen et al. | 715/734 |
| 2008/0027705 A1 * | 1/2008 | Koga | 704/2 |
| 2008/0126439 A1 | 5/2008 | Kaminsky | 707/203 |

FOREIGN PATENT DOCUMENTS

| | | |
|---|---|---|
| EP | 1 613 111 | 1/2006 |
| WO | 98/33345 | 7/1998 |
| WO | 2006/097839 | 9/2006 |

OTHER PUBLICATIONS

Combined Search and Examination Report from UK Application No. GB0902405.0, dated May 20, 2009.

* cited by examiner

*Primary Examiner* — Ranodhi Serrao
*Assistant Examiner* — Farrukh Hussain
(74) *Attorney, Agent, or Firm* — Zilka-Kotab, PC

(57) ABSTRACT

A method of specifying changes to a communications network is disclosed. The method uses a network model representing a current configuration of the communications network. Scope information is received defining a subset of the network model to which changes are to be made. Model information relating to the defined subset of the network model is copied in accordance with the scope information, to create a partial model copy. The partial model copy is then modified to represent a planned configuration of the communications network. The partial model may be validated as consistent with the network model for the current configuration, and to reserve resources within it. Changes within the partial model may be passed to other models, including the current configuration.

39 Claims, 18 Drawing Sheets

METHOD AND SYSTEM FOR SPECIFYING PLANNED CHANGES TO A COMMUNICATIONS NETWORK

The present application claims the priority of a United Kingdom patent application filed Feb. 13, 2009 under application number 0902405.0, which is incorporated herein by reference.

The present invention relates to methods and systems for specifying planned changes to a communications network.

Prior art network management systems typically provide a network model, stored in a database, representing a current configuration of a communications network. Planners can use this model to plan changes and enhancements to the network. After such changes have been implemented in the network, the network model may then be updated to reflect the new configuration of the network.

However, planned changes may often be specified in an ad hoc, informal manner, which does not relate directly to the specific details of the network model. For example, notes may be added to a network model describing future planned modifications. However, if planned modifications are not defined sufficiently rigorously it can be difficult for other users of the network management system to understand the exact nature of the planned changes. Also, this approach does not provide a planner with a clear picture of how planned changes will affect the network.

In some cases, a network planner may modify the network model directly to see how planned changes will affect the network, but this results in the network model no longer corresponding to the actual operational network. To address this, a planner may instead use a copy of the network model database to plan changes. However, it can then be difficult to merge changes made in the copy back into the main model. If multiple planners are working on the model independently, each planner may need a separate copy of the database, exacerbating the problem of collating the planned changes. Also, the entire database may have to be locked if a planner wishes to transfer changes from a copy over into the main operational model database, affecting other users of the network management system.

The present invention seeks to alleviate some of these problems.

Accordingly, in a first aspect of the invention, there is provided a method of specifying changes to a communications network, comprising: storing a network model representing a first configuration of the communications network; receiving scope information defining a subset of the network model to which changes are to be made; copying model information relating to the defined subset of the network model in accordance with the scope information, to create a partial model copy; and modifying the partial model copy to represent a second configuration of the communications network.

This can allow planning to be performed using a copy of only a relevant portion of the network model, avoiding the need for maintaining and synchronizing multiple different copies of an entire network model database. Also, several planners can simultaneously work on different portions of the network (or even on the same part of the network), with each planner working on a different partial model copy. Furthermore, changes can then be specified directly in the partial model copy using the same amount of detail as is used in the network model itself, enabling more accurate and reliable planning (compared to more ad hoc, informal approaches to specifying planned changes).

The term "network model" preferably refers to a data representation of a communications network or similar resource infrastructure, defining the network resources, and if appropriate interconnections and other relationships between resources. The term "network resource" preferably includes physical and logical resources of the communications network. Physical resources may, for example, include network equipment including network devices (e.g. routers, switches), device components, cards, ports, cables, ducts and the like. Logical resources may include, for example, logical connections (for example, provisioned communications circuits such as a VPN tunnel) and logical ports. Resources may also include computing resources in the network, such as servers, storage devices and application software. The model data relating to individual resources may, for example, include device configuration information (where the resource is a configurable device), location information, equipment type, model and software version and other relevant information. The model typically comprises a set of model objects representing resources of the network and defines relationships between model objects.

The first configuration is preferably a current configuration of the communications network (i.e. the network model represents the operational network), and the second configuration is preferably a planned configuration of the communications network.

Advantageously, the network model and the partial model copy are stored in the same database, preferably in the same database instance. Thus, a single integrated network inventory database can model different configurations of a network (e.g. an operational configuration and one or more planned configurations), removing the need for maintaining multiple databases or database instances for planning purposes.

Preferably, modifying the partial model copy comprises: receiving information defining one or more modifications to be made to the partial model copy; implementing the defined modifications in the copy; and storing one or more design records specifying the modifications made. By maintaining separate design records, subsequent processing steps can be simplified. For example, the changes made to the partial model copy can be implemented in the network model and in the physical network more easily and efficiently by reference to the design records, removing the need to provide complex model merging functionality for directly merging the partial copy into the network model.

To achieve this, the method preferably further comprises applying the modifications made to the partial model copy to the network model, the applying step preferably comprising modifying the network model in accordance with one or more (preferably all) of the design records.

In a preferred embodiment, the network model comprises a plurality of model objects representing resources of the communications network; and the partial model copy comprises copies of a selected plurality of the model objects of the network model. Model objects may be represented by appropriate data structures or entities in the database, for example using table rows in a relational database or objects in an object database. The term "object" as used herein shall be construed accordingly and is not intended to be limited to objects in an object-oriented programming sense but includes any appropriate data representation.

Preferably, the received scope information specifies one or more model objects to be included in the subset, the method comprising including the one or more specified model objects in the partial model copy. Alternatively or additionally, the received scope information may specify at least one seed object to be included in the subset, the method comprising:

identifying one or more model objects associated with the seed object in the network model; and including the identified model objects and preferably the at least one seed object in the partial model copy. This can provide an efficient mechanism for specifying which portion of the network model is to be included in the partial model copy. Preferably, one or more objects are identified which have a predetermined relationship with the seed object (for example, being associated with the same physical location as the seed object or having a hop distance of no more than a specified limit from the seed object). The scope information may specify multiple seed objects.

Preferably, the method comprises storing information defining a plan, the plan representing planned changes to the communications network, the plan including or associated with the partial model copy. For example, a plan object representing the plan may be stored in the database. One or more design records may be stored specifying modifications made to the partial model copy, the design records being associated with the plan. Thus, a plan may be represented by a partial model copy modified to represent a planned configuration and design records defining the modifications made (if any), and optionally by other information (such as a plan name or identifier).

Advantageously, the method comprises validating one or more network modifications made in the plan against the network model. Preferably, validating one or more modifications comprises determining whether the one or more modifications could be successfully carried out in the network model. Preferably, validation is based on design records associated with the plan. Validation preferably involves processing any design records associated with the plan and determining, for each design record, whether the modification(s) defined by the design records can be carried out in the network model. In this way, compatibility of the plan with the network model can be checked (for example where the network model may have changed since the partial model copy was made), and problems during subsequent implementation of a plan can be avoided.

In a preferred embodiment, the method comprises identifying one or more network resources required for implementing planned changes, and marking the identified resources in the network model as being reserved. The method may comprise preventing use of a reserved resource and/or providing an alert if use of a reserved resource is attempted.

The method may comprise preventing use of a reserved resource or providing an alert if use of a reserved resource is attempted in another plan, and/or if use of a reserved resource is attempted in the network model (e.g. by a process other than a planning process). An attempted use may, for example, be inclusion of a resource in a plan, allocation of a resource to a service or circuit, modification of a resource or its configuration, or deletion of a resource. Different actions may be performed depending on the type of use; for example, an alert may be provided for one type of attempted use (e.g. inclusion in a plan, allocation to a service), with the attempted use however being allowed to proceed, whilst other types of use (e.g. modification, deletion) may be prevented altogether. In this way, conflicts between plans, and between planning processes and other processes may be prevented.

The method may comprise receiving information specifying a further plan, and including model information relating to a subset of the network model in the plan in accordance with scope information relating to the plan and scope information relating to the further plan. In this way, dependencies between plans may be modelled. The plan dependency may be specified during creation of the plan. Information may be stored for the plan specifying that the plan is dependent on the further plan. In this way, plans may be defined in a modular fashion, simplifying planning and allowing multiple planners to work on complex network modifications.

Preferably, after copying model information to create the partial model copy, network changes made in the further plan are identified and applied to the partial model copy of the plan. This is preferably done by accessing design records associated with the further plan and implementing the design records in the plan (i.e. performing the modifications specified in the design records in the plan's partial model copy).

Preferably, the method further comprises implementing the changes represented by the plan in the network model, the implementing comprising accessing first design records defining modifications made in the plan and second design records defining modifications made in the further plan and carrying out the modifications defined in the first and second design records in the network model. Thus, for dependent plans, design records for both plans are applied, preferably in order according to the dependency relationship, i.e. the parent plan's design records are applied before the dependent plan's design records.

In preferred embodiments, the method comprises implementing the changes defined in the plan in the communications network. As for implementation in the network model, implementation is preferably performed in accordance with the plan's design records (and optionally design records of one or more other plans on which the plan is dependent as set out above). Implementing the changes may comprise at least one of: installing equipment, modifying installed equipment, performing manual configuration of equipment, and transmitting configuration information to one or more network devices to perform automatic configuration of the network device(s).

In a preferred embodiment, the method is performed in part by or interacts with an automatic activation/configuration system. In this embodiment, design records for a plan are processed and, for one or more of the design records (for example, for those relating to automatic configuration activities), instructions are transmitted to the automatic activation/configuration system to initiate configuration of the appropriate network resources in accordance with the design record, to thereby implement the changes specified in the design record in the network.

The method may form part of a method for provisioning a service, in which a plan is created to define network changes required for provisioning of the service. Provisioning of the service may then comprise implementing the plan in the network and/or network model, and may optionally comprise implementing further changes not represented in the plan (e.g. configuration/activation).

The method may include receiving a plurality of plans defining alternative modifications to network resources (preferably to the same or overlapping groups of network resources); selecting one of the plurality of plans; and implementing the selected plan in the network and/or the network model (preferably based on an analysis or comparison of the plans).

Preferably, the network model and partial model copy are associated with respective contexts within a network inventory, preferably wherein the network model is associated with a first context defining an operational state of the network and the partial model copy is associated with a second context representing a planned state of part of the network. The network model and the partial model copy are preferably associated with respective model context identifiers, the method comprising limiting access to model information based on the model context identifiers, preferably to provide access only to model information associated with a specified context.

In a further aspect of the invention, there is provided a method of planning changes to a communications network, comprising: storing a network model comprising a plurality of model objects representing resources of the communications network; storing a plan representing planned changes to the network, the plan comprising copies of a selected subset of model objects; modifying the model object copies in the plan to represent a planned configuration of the network; storing design records specifying the modifications made and associating the design records with the plan; and implementing the plan in the network model, the implementing comprising modifying the network model in accordance with the stored design records.

Preferably, the method further comprises implementing the plan in the communications network, the implementing comprising modifying the communications network in accordance with the stored design records. Preferably, the plan is implemented in the network model after implementation in the network, for example after receipt of confirmation that the design records have been successfully implemented in the network. Implementation in the network preferably comprises transmitting configuration instructions to one or more devices in the network (based on design records).

The invention further provides a method of validating planned modifications to a network, comprising: accessing first model data representing a first (preferably current/operational) configuration of the network; receiving planning data comprising: second model data representing a second (preferably planned) configuration of the network; and design records specifying changes made to the second model data; the method further comprising processing one or more of the design records to determine whether the first model data can be modified in accordance with the one or more design records.

The invention further provides a method of processing planning data defining planned modifications to a network using a network model representing the network, the method comprising: receiving planning data defining planned modifications to the network, the planning data preferably comprising a modified copy of a portion of the network model, modified to represent a planned configuration of the network, and design records specifying the modifications made; identifying one or more network resources in the network model required for implementation of the planned modifications; and associating reservation information with the identified resources in the network model to mark the resources (or resource capacity associated therewith) as reserved. The method preferably comprises preventing use of reserved resources and/or providing an alert if such use is attempted as set out above.

The invention also provides a network planning system having means for performing any method as set out above or described below.

In a further aspect of the invention, there is provided a network management system comprising: a database for storing a network model comprising a plurality of model objects representing network resources, wherein given model objects are associated with context identifiers, a context identifier identifying one of a plurality of contexts with which a respective model object is associated; wherein a first of the plurality of contexts is an operational context, the portion of the network model associated with the operational context representing a current configuration of the network; and wherein one or more further contexts of the plurality of contexts are planning contexts, the portion of the network model associated with a planning context defining a planned configuration of the network (preferably a planned configuration of a subset of the network to which the planning context relates).

The system preferably further comprises means for limiting access to model objects based on the context identifiers. This can simplify operations using the network model and can prevent errors (for example modifications being made in the wrong context). The limiting means is preferably configured to prevent access by at least one system component to model objects associated with one or more contexts.

The system preferably comprises means for selecting one of the plurality of contexts as a working context, the limiting means configured to prevent at least one component of the system from accessing model objects in any context other than the working context. The selecting means may comprise a user interface and/or an application programming interface (API).

Preferably, the system comprises a user interface for at least one of viewing and modifying model objects, the user interface configured to provide access to model objects of the working context only. In this way, user interaction with the system can be simplified, leading to reduced errors and improved efficiency.

A given planning context preferably corresponds to a subset of the operational context's network model. The given planning context preferably comprises a copy of the subset of the operational context's network model, modified so as to define planned modifications to the network.

Preferably, the limiting means hides model objects associated with one or more contexts from database users (where users may include human users as well as system processes). This can simplify interaction with the system and reduce the complexity of other components accessing the model.

Advantageously, the limiting means is configured to prevent database queries relating to model objects from at least one (preferably each of) returning, modifying, adding and deleting model objects associated with the one or more hidden contexts. The limiting means is preferably configured to modify queries dynamically to limit query results to one or more non-hidden contexts. This can simplify database queries, since the queries need not explicitly take context into account.

The system preferably comprises means for selecting one of the plurality of contexts as a working context, the limiting means being configured to modify queries dynamically to limit query results to the working context. In a preferred embodiment, the limiting means comprises a database management system providing Virtual Private Database functionality configured to limit database access based on context identifiers associated with model objects.

The system may further comprise a database trigger configured, in response to the addition of a model object to the database, to set the context identifier for the model object to a current working context.

Preferably, the database is a relational database, model objects being stored as rows in one or more database tables, a model object stored as a row having one or more fields for attributes of the model object including a context identifier field.

In a further aspect, the invention provides a method comprising: storing a network model comprising a plurality of model objects representing network resources, wherein given model objects are associated with context identifiers each identifying one of a plurality of contexts for the respective model object; wherein a first of the plurality of contexts is an operational context, the portion of the network model associated with the operational context representing a current configuration of the network; wherein one or more further contexts of the plurality of contexts are planning contexts, the portion of the network model associated with a planning context defining a planned configuration of the network; and wherein the method preferably further comprises: limiting access to model objects in accordance with the context identifiers.

In a further aspect of the invention, there is provided a network management system comprising a user interface for at least one of viewing and modifying network information; wherein the user interface is operable in a plurality of contexts, including a first context where network information relating to an operational configuration of the network is displayed or modified, and one or more further contexts in which network information corresponding to one or more planned configurations of the network is displayed or modified; wherein the user interface further provides means for switching from a currently active context selected from the first and further contexts to another of the first and further contexts. The system may comprise a database for storing network information, the database associating network information with context information, wherein the user interface provides access to view or modify network information associated with a currently active context.

In a further aspect of the invention, there is provided a network planning system comprising: means for storing a network model representing a first configuration of the communications network; means for receiving scope information defining a subset of the network model to which changes are to be made; means for copying model information relating to the defined subset of the network model in accordance with the scope information, to create a partial model copy; and means for modifying the partial model copy to represent a second configuration of the communications network.

In a further aspect of the invention, there is provided a network planning system, comprising: means for storing a network model comprising a plurality of model objects representing resources of the communications network; means for storing a plan representing planned changes to the network, the plan comprising copies of a selected subset of model objects; means for modifying the model object copies in the plan to represent a planned configuration of the network; means for storing design records specifying the modifications made and associating the design records with the plan; and means for implementing the plan in the network model, the implementing comprising modifying the network model in accordance with the stored design records.

In the above system aspects, the various means for performing tasks or activities are preferably provided at least partly by a suitably programmed computing device, typically comprising at least a processor and associated memory configured to perform the tasks or activities.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Embodiments of the present invention provide a network management and planning system for communications networks. The network management and planning system maintains a network inventory or network model which stores information about the network, including information defining devices, connections and other resources in the network.

Overview

Figure 1:
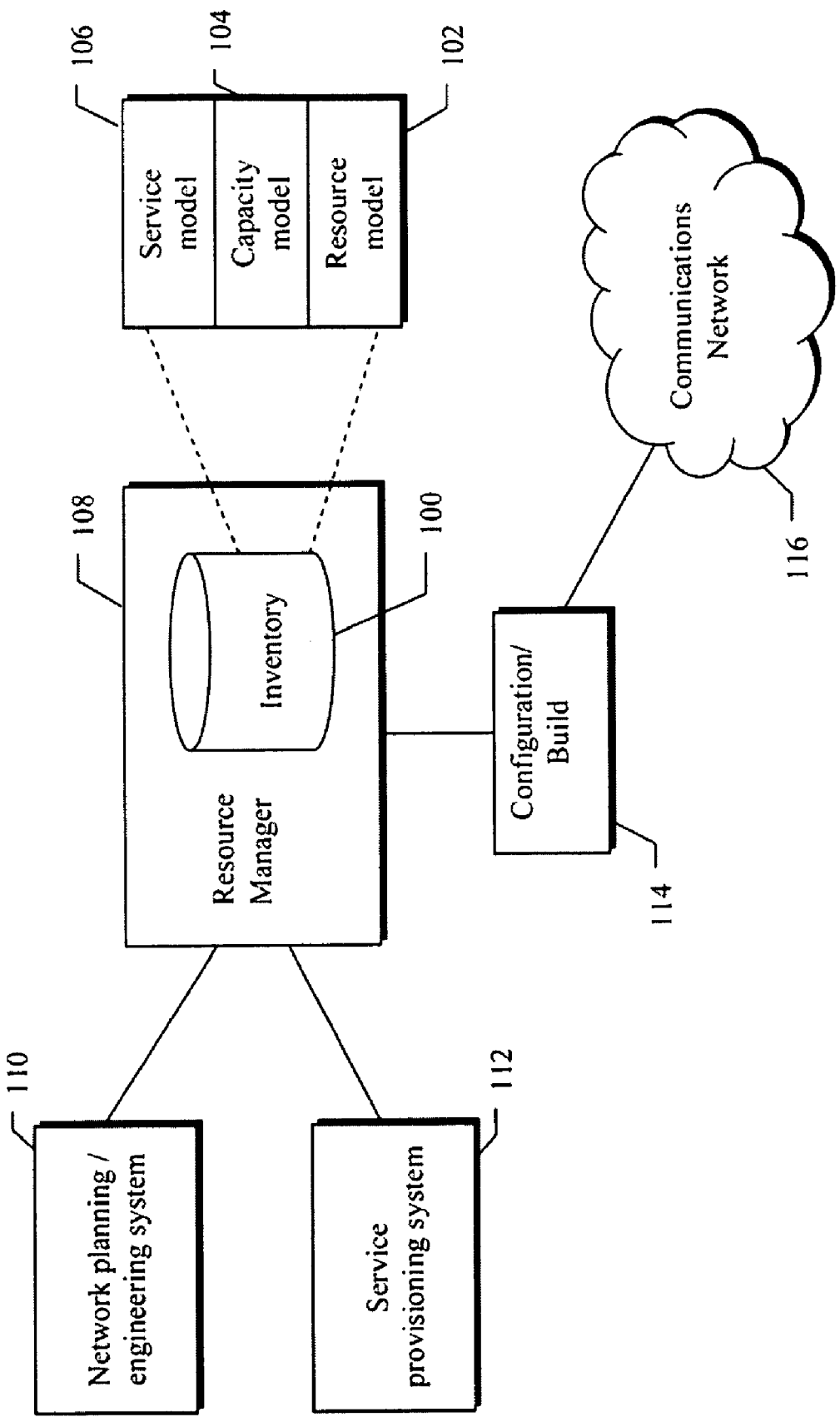
FIG. 1 illustrates a network management and planning system in overview.

A network management and planning system in accordance with an embodiment of the invention is shown in overview in FIG. 1.

The network management and planning system provides functions for managing a communications network 116 and for carrying out planning activities relating to the network. The system comprises a resource manager application 108, which manages an inventory 100. The inventory 100 includes information describing the network being managed.

Specifically, the inventory 100 includes a model of the communications network being managed including its resources and the relationships and interconnections between the resources. For example, the network model may model an IP network including, for example, routers and switches, or a mobile telecommunications network including home location registers, short message service centres, base stations, mobile switching centres and the like. In another example, the inventory may model an IT infrastructure comprising servers, storage devices, user terminals and connections between them.

Unless otherwise required by context, the term "resource" as used herein refers to the physical components of the managed network or infrastructure, such as devices (e.g. servers, terminals, switches, routers), components of devices (e.g. cards, ports), and connections between devices and components. Additionally, the term may refer to logical entities (e.g.

virtual servers, logical ports, and communications connections across networks) that are useful in modelling the networked communication and information capability. When reference is made to "physical resources", such reference preferably includes logical resources of this kind.

A number of subsystems may interact with the resource manager 108 to manage the communications network. These subsystems may, for example, include user interfaces, scripts and APIs through which operators or external systems may act on the inventory 100 to perform various network management functions. For example, a network planning and engineering subsystem 110 may be provided to allow additions and changes to the network to be specified. A service provisioning subsystem 112 may be provided to allow for the provisioning of services to users of the network. Examples of other systems include service assurance systems to identify and remedy service problems, and billing systems, which make use of inventory data.

Changes made to the inventory 100, for example through network planning/engineering system 110 or service provisioning system 112, are implemented in the network 116 by way of network configuration/build component 114. The configuration/build component 114 may include automatic processes, manual processes, or a combination thereof. For example, a service provisioning action performed by the service provisioning system 112 may result in a change to a resource configuration modelled in inventory 100. This configuration change may be translated into configuration instructions and transmitted to the relevant resource by the configuration component. On the other hand, a network planning activity specifying addition of network resources may result in manual build jobs, which may be managed, for example, using a workforce management system. Configuration/build component 114 may also include network discovery and synchronization functionality for determining a current configuration of network elements and checking the discovered configuration against the inventory; identified discrepancies can then be resolved by updating the inventory or modifying the network configuration as appropriate.

As mentioned above, the inventory 100 provides a model of the network in terms of the resources and connections or relationships between resources. Configuration information for resources may also be defined in the model (e.g. configuration parameters for a router). This part of the model is referred to as the resource model 102.

The inventory 100 preferably stores additional information about the network being managed, in particular defining the application and communications services that the network is used to provide. For example, the inventory can model capabilities and capacities associated with resources in the model, and services provisioned to users of the network, which utilise the resources. Accordingly, in a preferred embodiment, in addition to resource model 102, inventory 100 further comprises a capacity model 104 and a service model 106. The capacity model 104 is associated with the resource model and represents resource capacity provided by the resources in an abstract manner. The service model 106 represents services provisioned to users of the network or applications operating in the network and models how those services or applications utilise the resource capacity defined in the capacity model and/or the resources defined in the resource model.

The system may additionally provide a product model (not shown) defining the service products or offerings made available to users by the service provider. The product model may be in the form of or comprise a service catalogue defining the types of services available, and may additionally define available implementation technologies that may be used to provide services and other relevant information. Service definitions in the product model or service catalogue preferably comprise capacity requirements for the services, defining the resource capacity that should be allocated when a service instance of a given service type is provisioned for a user. Service definitions may additionally include other service parameters, e.g. service quality information. The product model/service catalogue may be part of the inventory 100 or may be separate.

Though the resource model, capacity model and service model could be provided as separate databases, in a preferred embodiment, they are merely separate aspects of a single integrated network model, and effectively form different layers of that model.

Network Resource Model Example

Figure 2A:
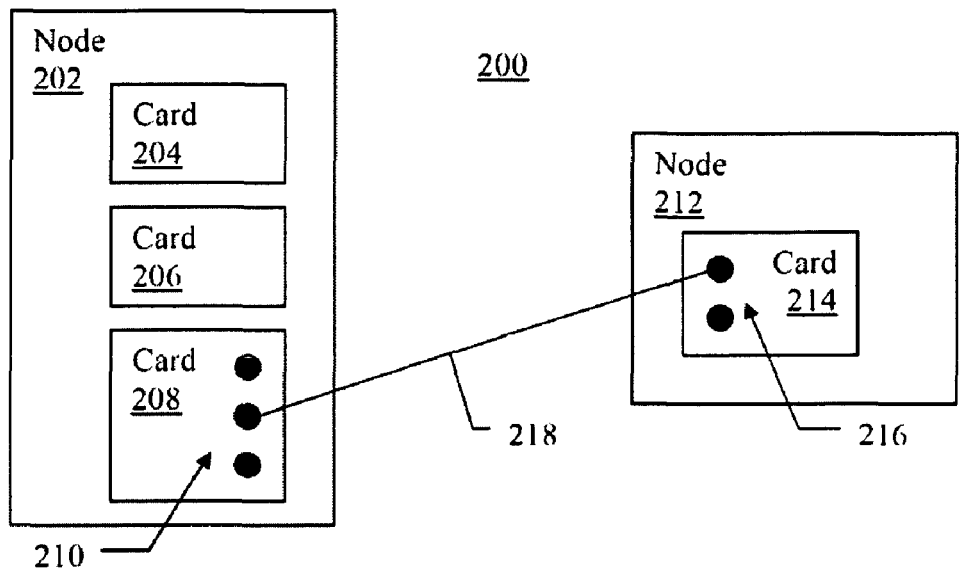
FIGS. 2A and 2B show an example of network resources of a network and a corresponding network model.
Figure 2B:
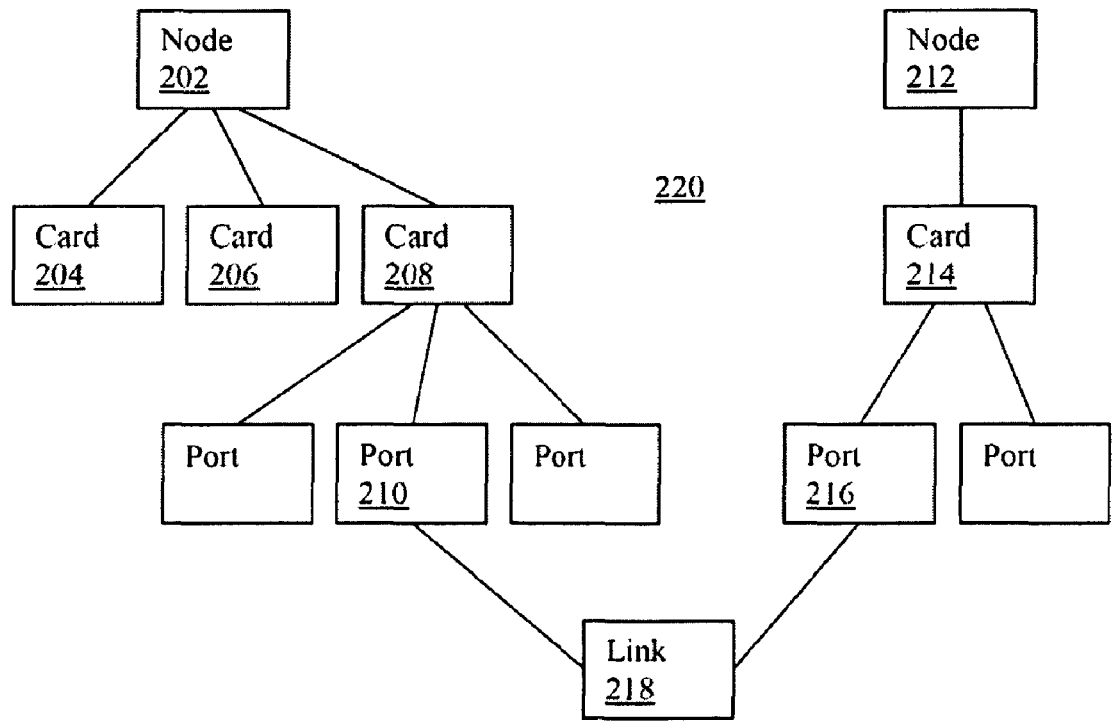

FIG. 2A illustrates an example of a small portion of a network as may be modelled in the network resource model 102. FIG. 2B illustrates corresponding model objects in the resource model.

The FIG. 2A example shows part of a network 200 including a first node 202, such as a router, comprising three cards 204, 206, 208. Each card may include a number of ports 210. A second node 212 including a single card 214 is also shown. The two nodes 202 and 212 are connected by a link 218 between a first port 210 on card 208 of node 202 and second port 216 on card 214 of node 212.

The above is intended as a simplified, illustrative example of a small segment of a network. A real network model will typically comprise many more network elements and connections between network elements, and will model other types of objects beside nodes, cards, ports and links (for example, locations, racks/rack shelves, application servers, slots, logical ports, logical circuits etc).

Modelling of the FIG. 2A network in the resource model 102 is illustrated in FIG. 2B. This shows model objects corresponding to the above network elements, using the same reference numerals.

Thus, node 202 is represented in the resource model 220 by way of a corresponding "node" model object 202. Three "card" model objects 204, 206, 208 are associated with the node object 202 in the model. Each card object may similarly be associated with a number of "port" model objects (e.g. 210) representing ports of each card. Node 212 is modelled in a similar way. A link object 218 is also provided representing the network connection between the two nodes, and is associated in the model with the port objects 210, 216 representing the ports at which the link terminates.

The model objects can be represented in the database using any suitable data structures appropriate to the database technology used. In preferred embodiments, a relational database is used. In that case, different types of model objects may be stored in different database tables, with model objects of a given type stored in respective rows of the relevant table, the table having a number of fields or columns for the various attributes of the model object. For example, in the present case, a "node" table would include two rows, including identifiers and other attributes for each of node 202 and 212. However, other database technologies may be used using different data structures, such as object databases.

Software Architecture

Figure 3:
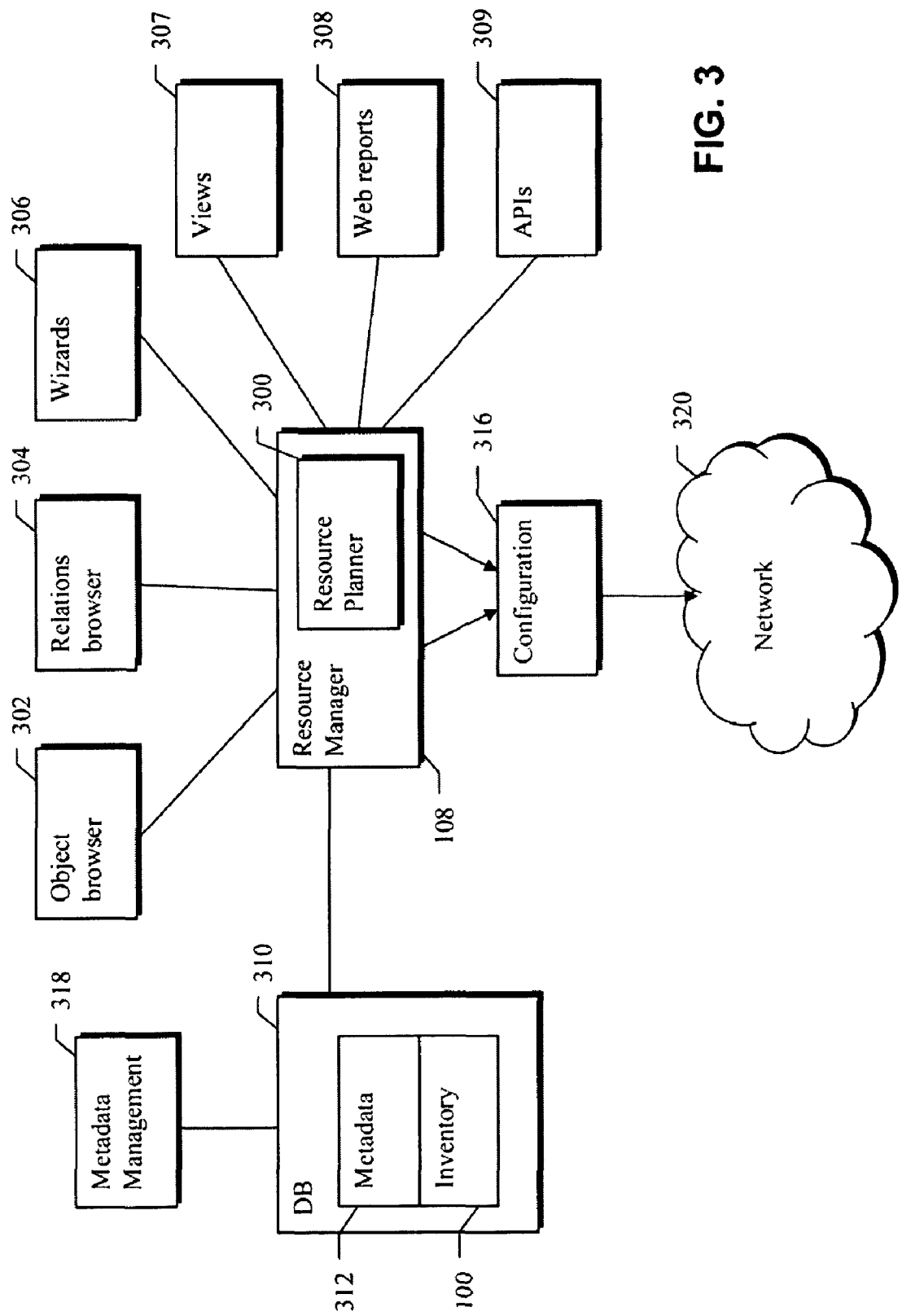
FIG. 3 illustrates a software architecture of a network management and planning system.

FIG. 3 illustrates software components of the resource management and planning system in more detail.

Resource Manager 108 maintains the network inventory 100 (in particular the resource model) stored in database 310 and allows operators to view and modify the model.

To this end, resource manager 108 provides a variety of user interface components to allow an operator to view and modify the model and to obtain various useful information about the model. In this example, the user interface components comprise an object browser 302, relations browser 304, wizards 306, views 307 and web reports 308.

Object browser 302 allows a user to view and optionally edit information defining the model objects making up the model 314. Object browser 302 preferably displays a "home page" for a selected model object, the home page listing information defining the model object, such as object name, type and other attributes. From the home page, the user may also navigate to other, related objects in the model.

Relations browser 304 displays information on relationships between model objects, by way of which the user may navigate the model, and may provide a visual representation of the model or portions thereof or specific relationships between model objects. Preferably, the user may also switch from the relations browser to the object browser to display the home page for a given selected object, and may similarly switch from the object browser to the relations browser.

Wizards 306 allow the user to define new model objects and modify existing model objects, in a step-by-step fashion as is known for wizard-style interfaces.

Views 307 provide additional specialised views of the model, focussing on certain aspects thereof. For example, these may include graphical representations of certain model objects or groups of related model objects and their relationships.

Web reports 308 provide reporting functionality, accessible via a web interface, for example to list certain types of model objects, determine dependencies between model objects, and the like.

Other user interface elements may be provided as appropriate.

Additionally, the resource manager preferably provides one or more Application Programming Interfaces (APIs) 309 by way of which other subsystems may access and make use of the resource manager's functionality.

The Resource Manager 108 can interact directly with the managed network 320 by way of network configuration subsystem 316 (which may also include network discovery/model synchronization functionality), for example to implement model changes in the network.

Database 310 additionally comprises metadata 312. Metadata 312 defines various types of modelling object that may be used in the model 314 and constraints on model object relationships, and can be used to tailor the resource model to specific application domains. The metadata may be entered and modified via a separate metadata management application 318.

A resource planner component 300 is provided as part of the resource manager 108. This allows operators to define planned modifications to the resource model (and hence network) without changing the resource model itself. The operator interacts with the resource planner by way of various user interface elements 302, 304, 306, 307, 308 as set out above. Other systems (e.g. automated planning subsystems) may also interact with the resource planner 300 by way of APIs 309. The resource planner user interface elements and APIs are preferably implemented as extensions to the resource manager interface elements and APIs.

Inventory

The resource planner 300 allows planned modifications, referred to herein simply as "plans", to be created and edited independently of the resource model. These plans can then be applied to the resource model at an appropriate time to implement the planned modifications.

Figure 4:
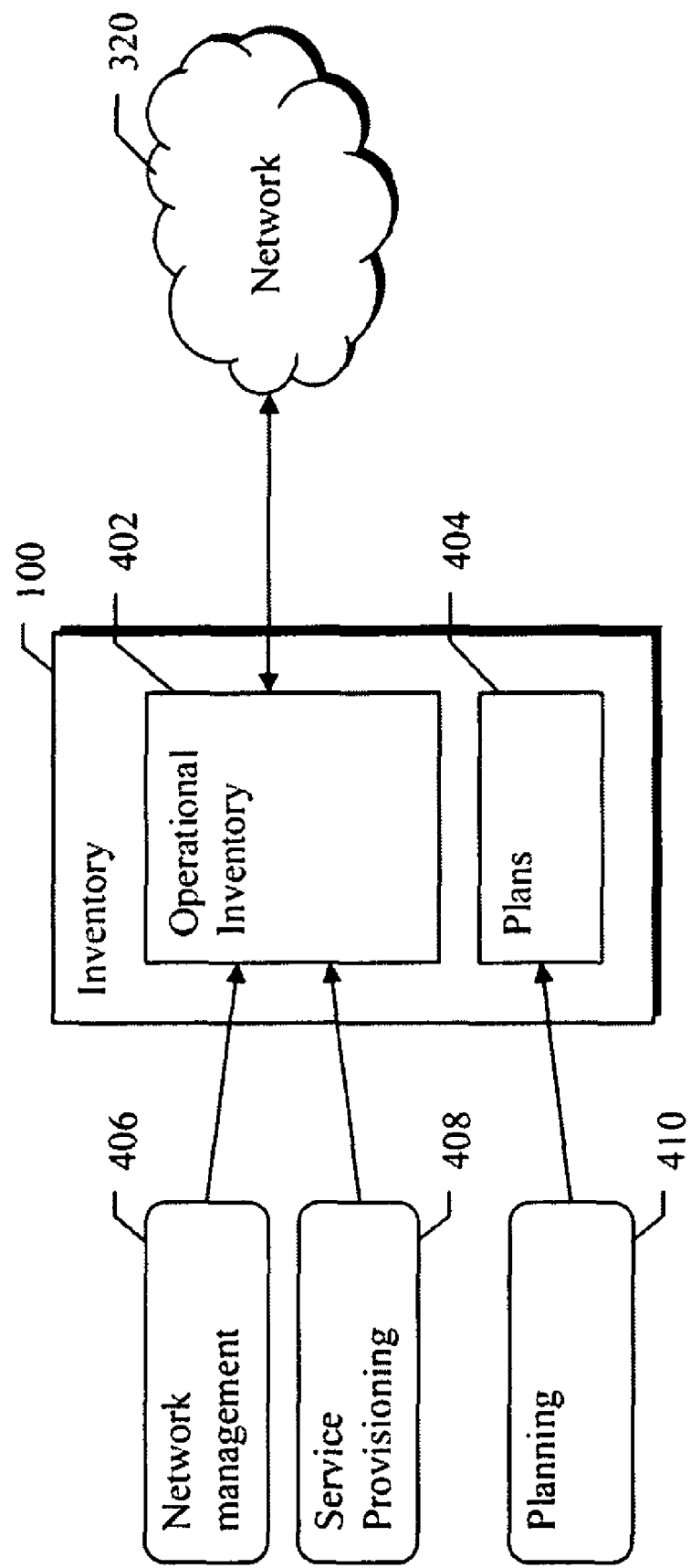
FIG. 4 illustrates a network inventory including an operational inventory and one or more plans.

This is illustrated in FIG. 4. As shown, the inventory 100 is divided into two parts. The operational inventory 402 represents the current, actual state of the network 320. Various processes which rely on an up-to-date view of the network, such as network management processes 406 and service provisioning processes 408 operate in the context of the operational inventory 402. Plans 404 define planned modifications to the operational inventory. Each plan comprises a copy of relevant portions of the operational inventory 402, modified as required, and represents a future, planned state of that portion of the operational inventory. Planning processes 410 operate on this part of the inventory.

Resource Planning Functions

The resource planner will now be described in more detail with reference to FIG. 5.

The resource planner 300 manages plans 404 and provides a number of planning functions, namely plan creation 502, plan editing 504, plan validation 506, plan reservation 508 and plan implementation 510, corresponding to the main stages of the planning process. This process is summarised as follows.

First, a plan is created (502) from the operational inventory. This involves copying a portion of the operational inventory relevant to the planned modifications. This partial copy forms a plan 501. The plan is then edited (504) to represent the intended changes to the network. Next, the plan is validated (506) against the network to check that it can be implemented. If required, resources needed for the implementation of a plan may be reserved (508) in the operational inventory (reservation may alternatively be carried out prior to validation). Finally, the plan is implemented (510) in the operational inventory, that is to say, the modifications defined in the plan 501 are made to the operational inventory, and the physical network is also modified and configured accordingly. In one embodiment, the plan is implemented first in the network (via network configuration and/or workforce management systems as appropriate), and subsequently (preferably after confirmation has been received that the changes have been made successfully), the operational inventory is updated. In that way, the operational inventory remains representative of the most recent consistent configuration of the network until the network modifications are complete and a new consistent configuration has been reached. However, other embodiments may modify the operational inventory before or at the same time as the physical network is reconfigured.

Each of the above functions will now be described in more detail with reference to FIGS. 6A-6E.

Figure 6A:
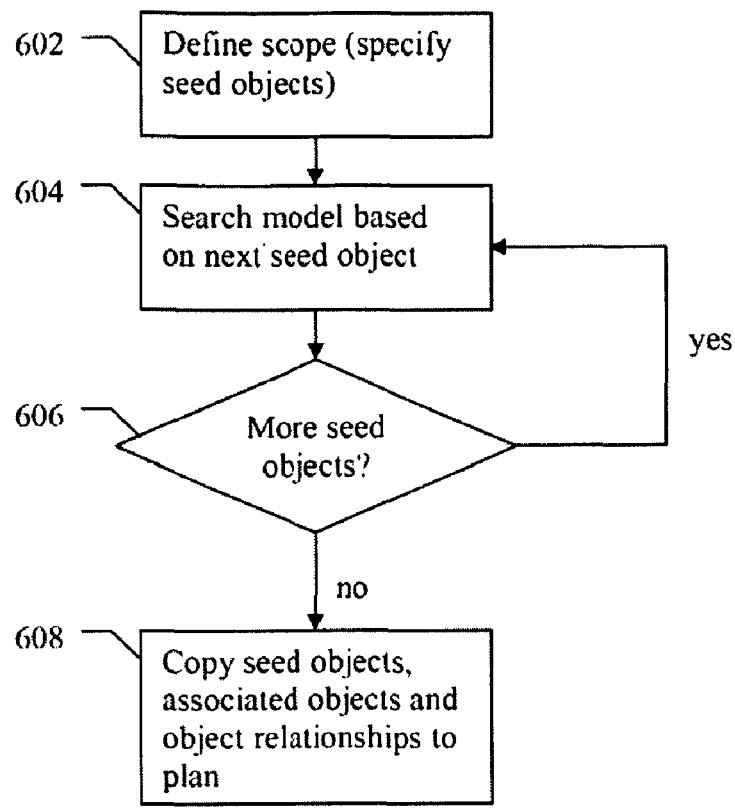
FIGS. 6A-6E illustrate functions of the resource planner in more detail.

Creation of a plan is illustrated in FIG. 6A. First, the scope of the plan is defined in step 602. The scope of a plan defines the subset of the operational inventory model that is copied into the plan. In one embodiment, the operator could select all the objects to be included in the plan, for example via a user interface listing or graphically representing the model. However, in a preferred embodiment, the plan scope is defined by way of seed objects:

Specifically, the user specifies one or more seed objects in the operational inventory. For each seed object, the resource planner searches the model (step 604) to identify other objects that are associated with the seed object in a defined away. In one example, the search identifies objects which represent sub-components of the seed object or which are physically located within the seed object. Thus, in the example of FIGS. 2A/2B, the search may identify "cards" for a "node" seed object or "ports" for a "card" seed object. The search is continued for each newly found object to identify further objects related to the newly found object. Thus, for example, if, in the FIG. 2B example, Node 202 is specified as a seed object, the search first identifies the sub-components of the seed object, namely cards 204, 206 and 208. Then, the search identifies further sub-elements of those sub-components, e.g. ports 210. The search may be implemented by an iterative or recursive tree-walking algorithm.

The process is repeated for each specified seed object (step 606). Once all seed objects have been processed, the identified objects, and relationships between those objects, are copied into the plan (step 608; alternatively, objects could be copied as they are found during the search). The seed objects themselves are also copied into the plan.

Thus, at the end of the process, the plan contains copies of the model objects corresponding to a subset of the inventory's network model. An operator can then perform planning on this partial copy of the model without affecting the operational inventory.

Figure 5:
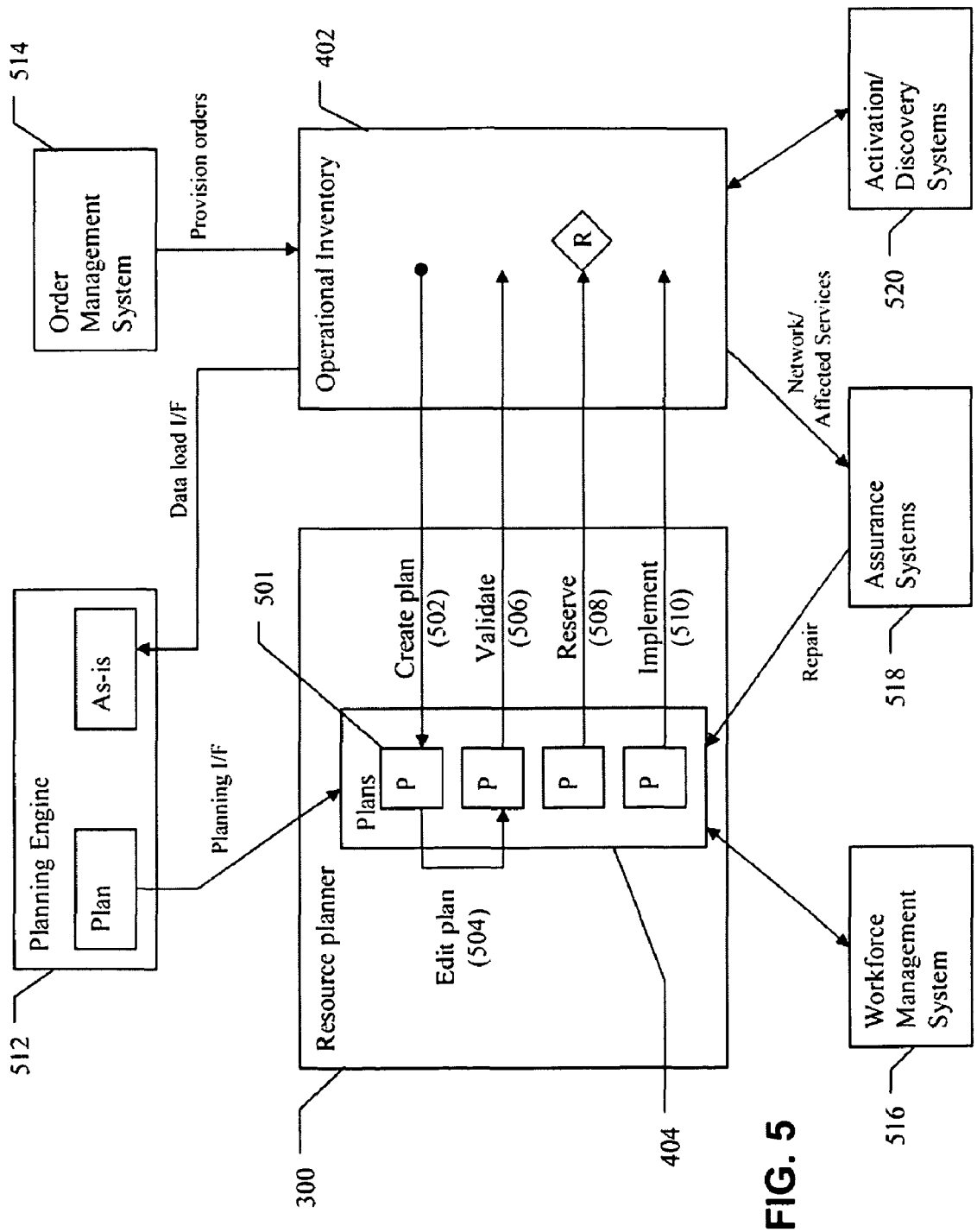
FIG. 5 illustrates functions of a resource planner.
Figure 6B:
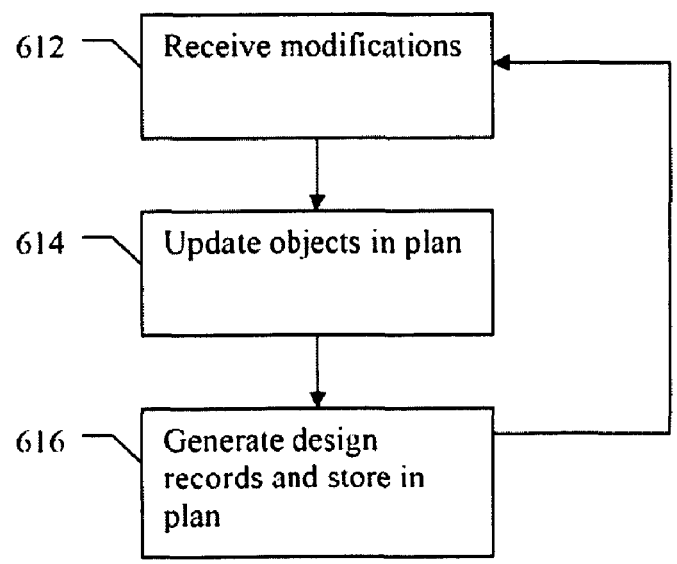

Planning is illustrated in FIG. 6B. In step 612, modifications are received. These are typically received via a user interface of the resource manager/planner, but may alternatively be received from an automated planning subsystem (e.g. planning engine 512 shown in FIG. 5). The model objects in the plan (which are copies of corresponding model objects in the operational inventory) are modified according to the specified modifications (step 614). For example, referring to FIG. 2A/2B, the operator may specify addition of a second card to node 212, in which case a new card object is created in the plan and associated with node 212.

Additionally one or more design records are created (step 616). The design records specify the changes made to the model objects in the plan during editing. Continuing the above example, one or more design records may be created specifying 1) creation of a card object with certain attributes, and 2) association of the new card object with node 212. The design records are stored as part of the plan. The process continues to step 612 as more modifications are received from the operator.

Figure 6C:
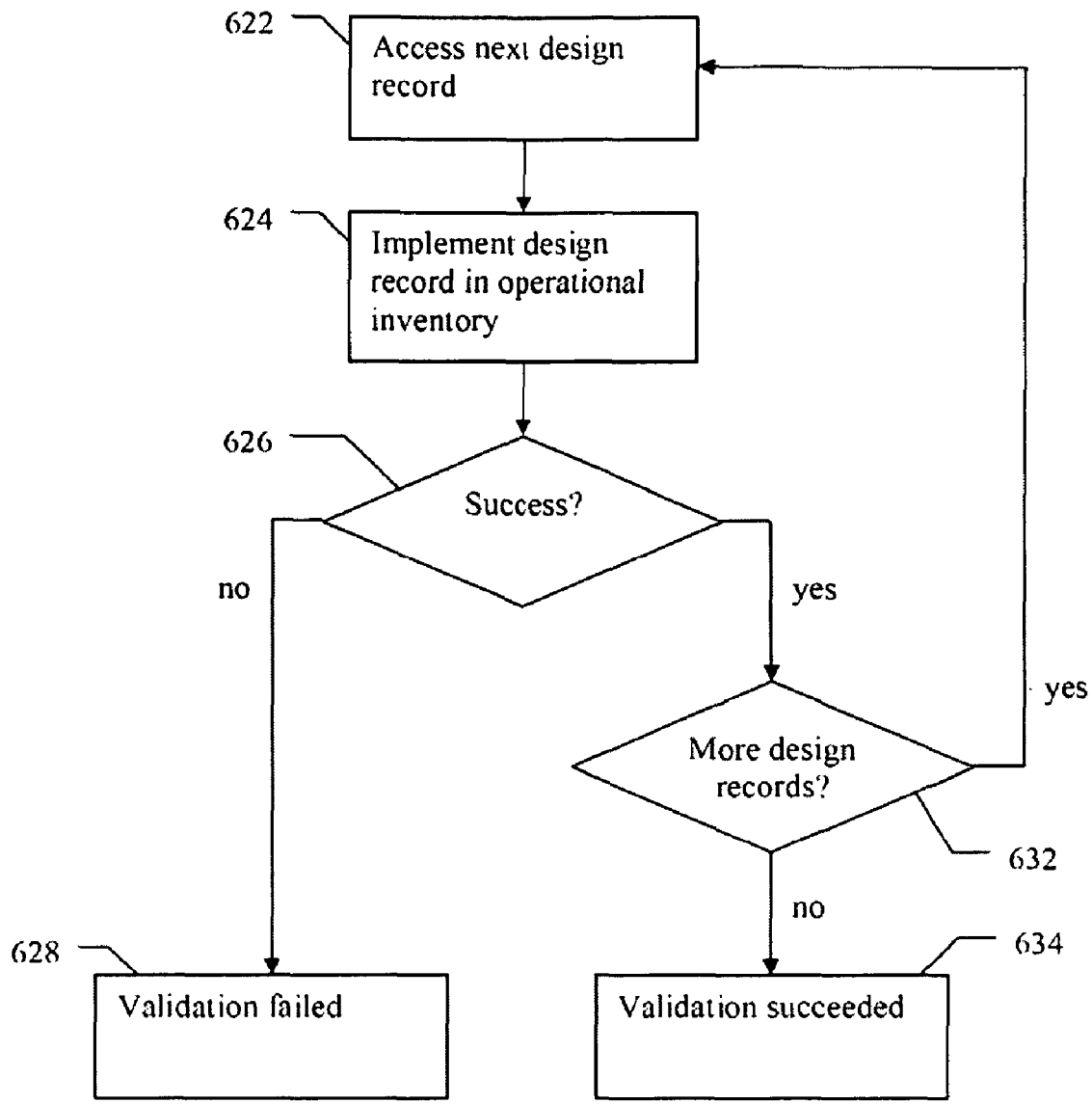

Plan validation is illustrated in FIG. 6C. The validation procedure processes the design records of a plan to determine whether they could be successfully implemented in the operational inventory. In a preferred embodiment, this is achieved by actually implementing the changes defined by the design records in the operational inventory, but without committing the changes at the end of validation.

As is illustrated in FIG. 6C, the first or next design record is accessed in step 622. The changes defined in the design record are implemented in the operational inventory (step 624, for example, by invoking appropriate API routines of the resource manager to make the required changes to the database). If, for any reason, the modifications fail (test 626), this means that the plan is not (or no longer) compatible with the operational inventory. Validation ends, indicating failure (step 628). If, on the other hand, the modifications succeed, the procedure checks whether the plan contains further design records (step 632). If there are more design records to be processed, the procedure continues with the next design record at step 622. Once all design records have been processed successfully, validation ends, indicating success (step 634). Regardless of whether validation is successful or not, the changes made are not committed to the database at the end of validation (depending on database technology used, this may, for example, involve performing a rollback). This ensures that the validation does not affect the state of the inventory.

Figure 6D:
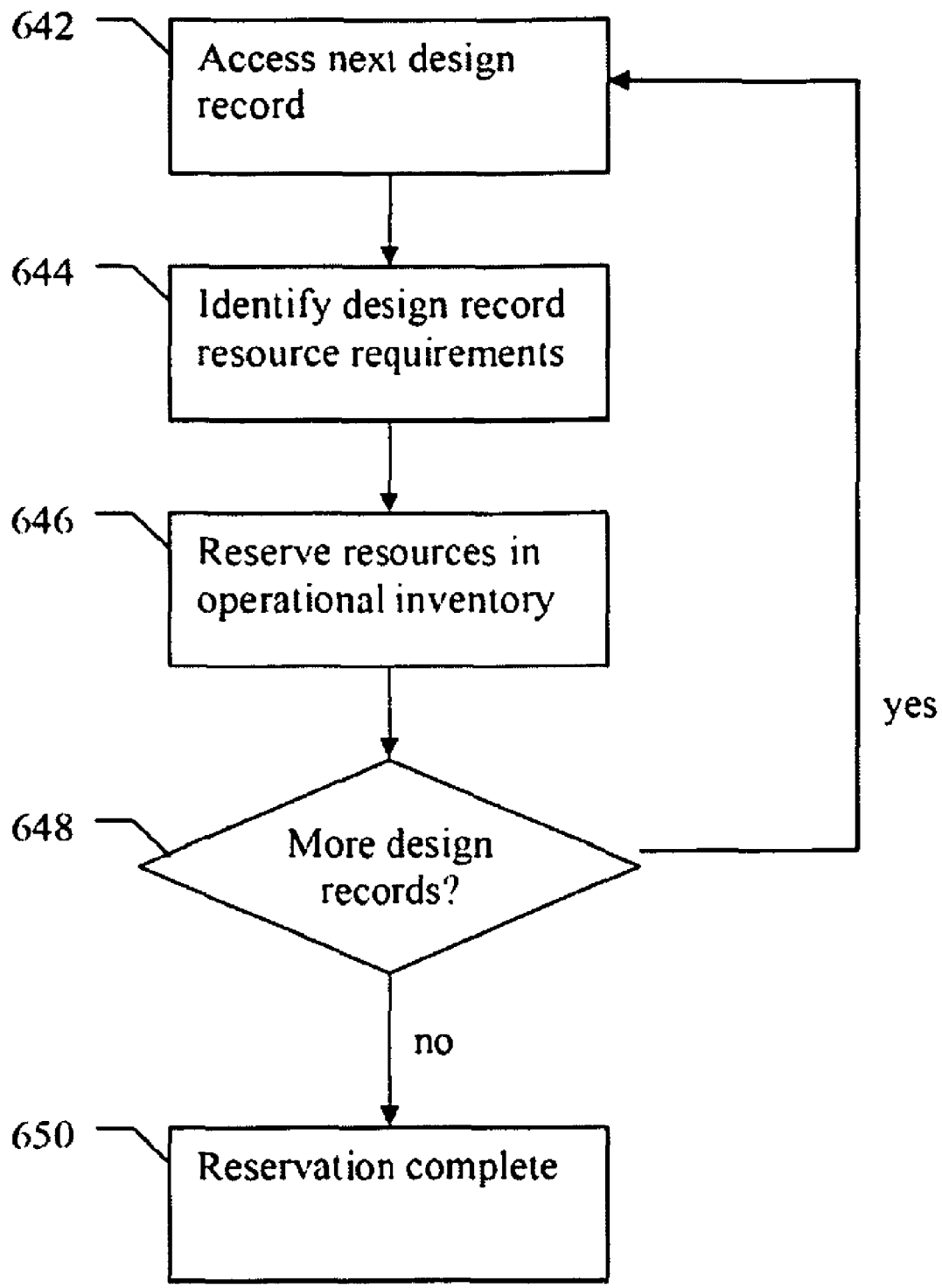

Resource reservation is illustrated in FIG. 6D. Resource reservation marks resources in the operational inventory as reserved, so as to keep them available until the plan is implemented. For example, a plan may specify addition of a card to a node. This typically requires a free slot in the node (unless an existing card is being replaced). Accordingly, a "slot" object associated with the "node" object may be marked as reserved to prevent that "slot" object being used by another planner.

As illustrated in FIG. 6D, in step 642, the first or next design record in the plan is accessed. In step 644, resources required by the design record are identified. The resources are reserved in the operational inventory in step 646. Preferably, this is achieved by creating a "reservation" object and associating this in the inventory with the object being reserved. This is described in more detail below. The procedure checks (test 648) whether the plan includes any more design records. If yes, the next design record is accessed at step 642. If not, reservation is complete (step 650).

If the procedure is unable to reserve certain resources, it preferably reserves only the available resources, and outputs an indication that not all resources could be reserved (possibly specifying the unreserved resources). Alternatively, the procedure could fail when a resource cannot be reserved (deleting any reservations made up to that point).

Figure 6E:
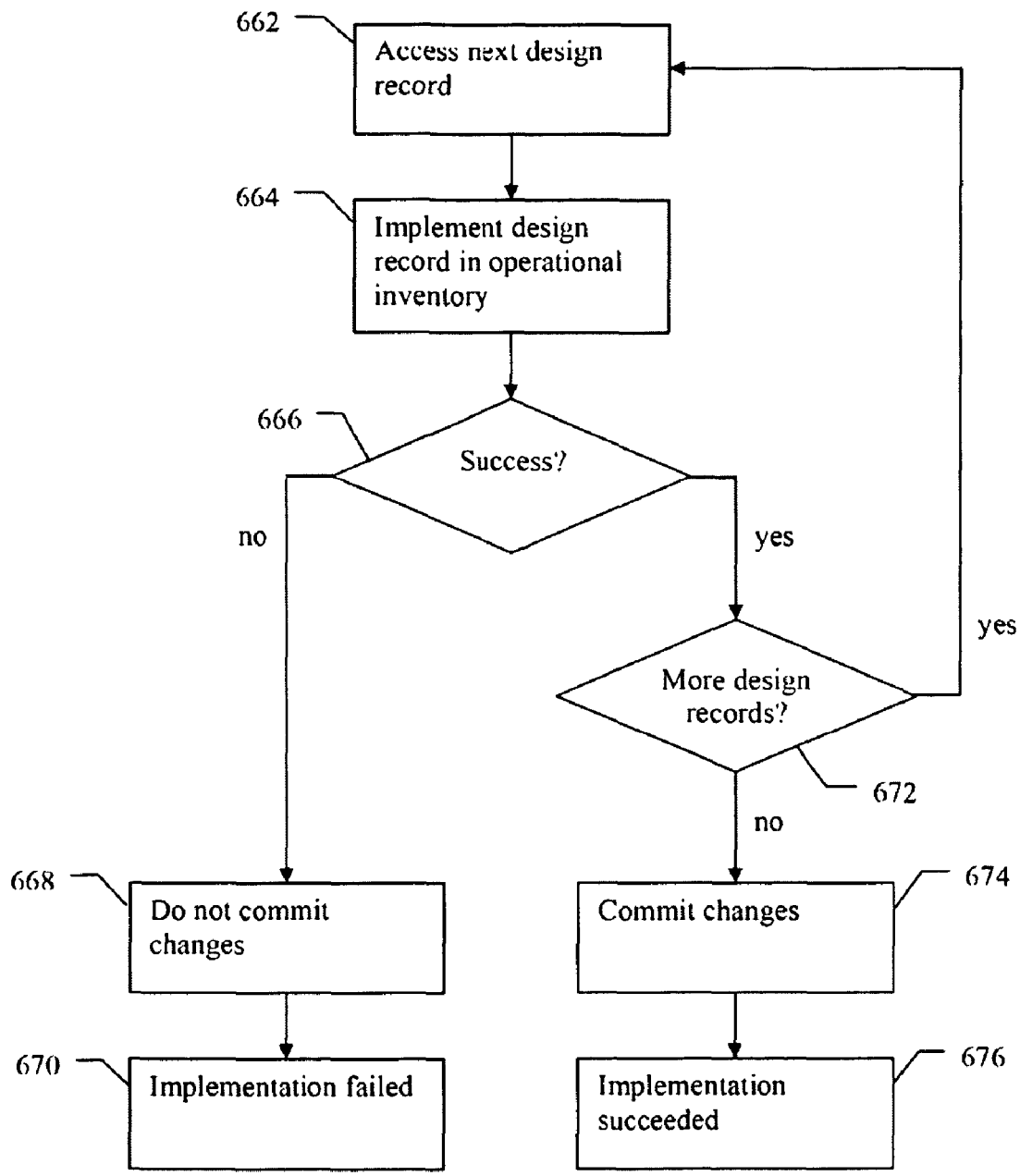

Implementation of a plan in the operational inventory is illustrated in FIG. 6E. This is analogous to the validation procedure set out above, except that, if all design records are successfully implemented in the operational inventory, then the changes are committed to the database.

Thus, as illustrated in FIG. 6E, the next (first) design record is accessed in step 662. The changes defined in the design record are implemented in the operational inventory (step 664, for example, by invoking appropriate API routines of the resource manager to make the required changes to the database). If, for any reason, the modifications fail (test 666), the changes made are not committed to the database (step 668) and implementation ends, indicating failure (step 670). If, on the other hand, the modifications succeed, the procedure checks whether the plan contains further design records (test 672). If there are more design records to be processed, the procedure continues with the next design record at step 662. Once all design records have been successfully processed, the transaction completes, the changes made are committed (step 674), and the implementation ends, indicating success (step 676).

As mentioned previously, implementation of a plan in the operational inventory is preferably performed once the necessary changes have been made to the physical network. The changes that may be required to implement a plan may include physical modifications, such as installation of new equipment and links, as well as software reconfiguration (e.g. configuration of a router). Physical modifications may be carried out by engineers, with engineering callouts scheduled using a workforce management system (e.g. workforce management system 516 of FIG. 5). Software configuration may be carried out under the control of an automated activation system (e.g. activation system 520), which generates and transmits configuration instructions to network devices. Resource planner 300 passes information to these subsystems based on the plan's design records, and receives back status/completion information from those subsystems. Once the design records have been implemented in the network, the plan is then implemented in the operational inventory using the procedure of FIG. 6E.

The process described above for implementing a plan into the operational inventory may also be used to implement one plan into another, by applying the design records from a first plan to the partial model copy of a second plan. This can be used, for example, when creating dependent plans, as described in more detail below. The validation process of FIG. 6C may similarly be used for validating changes in one plan against another plan's partial copy of the network model. More generally, any processes described herein in relation to the operational context can also be used with planning contexts. The system is preferably adapted to treat operational and planning contexts equivalently wherever possible.

Returning to FIG. 5, some interactions between the resource planner, operational inventory and certain external systems are also illustrated. For example, an order management system 514 may interact with the operational inventory 402 to provision customers' service orders. An automated planning system, referred to as the planning engine 512, may obtain a view of the current network ("as-is") from the operational inventory and generate plans via resource planner, for example to provide additional capacity in the network to support projected service requirements. Implementation of plans may occur via a workforce management system 516 (for manual installation and configuration activities), and via an activation system 520 (for automatic device configuration). The latter may also provide network discovery functionality to detect a current configuration of the network and modify the operational inventory accordingly. Assurance systems 518 may also be provided to monitor network performance and identify problems (e.g. device failures), and to generate plans for network repair activities.

Plans

As set out above, a plan typically consists of two things: a copy of a subset of the operational inventory, in particular in the form of copies of a set of model objects and associated relationships, and design records. Preferably, plans are stored in the same database as the operational inventory, using the same data structures. This is achieved by associating each model object with a context. One such context is designated the operational context, and this contains the operational inventory. All other contexts are planning contexts (alternatively, contexts may also be used for other purposes, for example one or more contexts, containing copies of relevant model information, could be provided for assurance or testing purposes).

In a preferred embodiment, context is implemented by way of a context identifier stored as an attribute of each model object. Thus, in a relational database implementation, each table comprises, in addition to an object identifier column, a context identifier column. This allows multiple copies of an object to coexist in the table, distinguished by the context identifier. The object identifier and context identifier together uniquely identify a specific copy of an object (and thus together form the table's primary key). A predetermined fixed value is assigned to identify the operational context.

Figure 7:
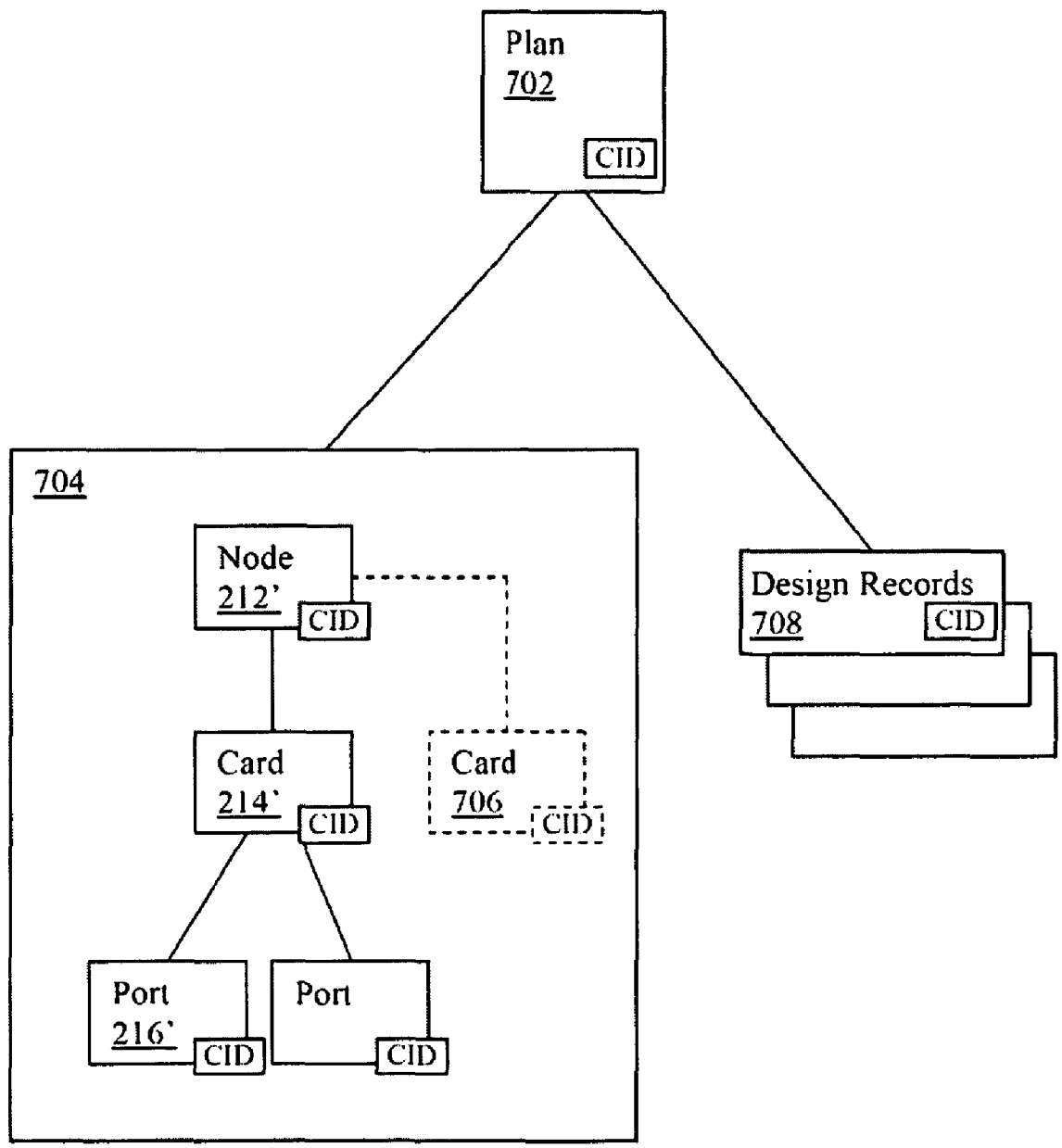
FIG. 7 is a schematic illustration of a plan.

FIG. 7 provides a schematic illustration of data structures representing a plan. A plan object 702 is stored in the database and includes various attributes relating to the plan, including, for example, a plan name, plan creation date, planned implementation date and the like. The plan 702 also includes a context identifier CID, which identifies the plan. In this example, the plan relates to addition of a card to node 212 as illustrated in the network model of FIG. 2B.

The plan further includes copies of relevant model objects 704, as defined by the plan's scope.

In this case, the plan's scope would specify the node 212 as a seed object. During creation of the plan, node 212 and its subcomponents are then copied into the plan (see FIG. 6A). The resulting plan thus includes a partial model copy 704 including object copies 212', 214' and 216'. Since the addition of the card does not affect any other part of the network, the planner need not include any other portions of the network model in the plan's scope.

A new card object 706 has been added to the plan by the planner and has been associated in the model with node object 212' (being a copy of node object 212 in the operational inventory of FIG. 2B). Design records 708 defining the changes made by the planner are also stored.

Each of the model objects forming part of the plan, including copies 212', 214', 216' and new object 706 are associated with the plan by way of the plan's context identifier CID. Design records are associated with the plan in the same way.

A variety of algorithms may be used to populate a plan with model objects based on one or more specified seed objects. In a preferred embodiment, the following three-part process is used:

Get the objects 'under' the defined seed objects—e.g. a device seed will contain all of the shelves/slots/cards/ports within it. Location will contain all devices and their contents. Card will contain all ports on it. Circuit will contain all of its timeslots or data partitions, plus the underlying routing data.

Get the edge connections—e.g. pull in all links and circuits terminating on the in-scope objects. This may be parameterised, for example no edge data/minimal edge data/full edge data.

Ensure referential integrity

The system attempts to keep the amount of data held in memory to a minimum (e.g. by creating table entries as the algorithm goes through the model) as the overall number of objects may be large.

Implementation of Context-Based Inventory

Referring back to FIG. 3, the resource manager 108 and its various user interface and system interface components (e.g. object browser 302, relations browser 304, wizards 306, views 307, reports 308 and APIs 309) are extended to be context-sensitive. Additional user interface functionality is provided to allow the operator to set the working context. After setting the working context to a given context, the operator can view and modify model objects within that context only. For example, the operator can set the working context to a given planning context (corresponding to a specific plan) and modify model objects within that context to define a planned state of the network. The operator can also set the working context to the operational context and then view and modify the operational context, corresponding to the actual current state of the network.

In a preferred embodiment, Virtual Private Database functionality is used to implement contexts in a simple and efficient way. Virtual Private Database functionality, as provided, for example, by the Oracle database management system, allows access to data in the database to be restricted dynamically, and is normally used for security purposes.

The Virtual Private Database functionality allows a policy to be defined which controls which data is visible to a user. Data not meeting the policy is effectively hidden from the database user, and any database queries accessing or modifying records in the database will not return such hidden data in their results sets.

The policy essentially defines a "WHERE" clause which is dynamically added to every query on execution. In the present case, a policy of the form "WHERE context_ID=working_context" can be used to limit all database queries (including SELECT, UPDATE, INSERT and DELETE queries) to the current working context.

A further advantage of this approach is that various system components, user interfaces, reports and the like which can operate in any context do not need to be explicitly modified to take context into account. Instead, these components are automatically limited to working in the current working context by the Virtual Private Database policy.

To ensure that newly added data is assigned the correct context, database triggers are additionally defined for each relevant table. These are triggered when a row is added to the table and set the context identifier for the new row to the current working context.

Reservations

A process of reserving resources required for implementation of a plan in the operational inventory has been described above in relation to FIG. 6D.

Preferably, reservations are modelled in the inventory by way of a Reservation object. When a resource is reserved, a corresponding Reservation object is created in the operational inventory. This object is associated with the model object being reserved (or a parent object as described below).

Three main types of reservations are supported. A basic reservation reserves a model object as a whole. For example, a slot object forming part of a router may be reserved (e.g. for later addition of a card).

A second type of reservation reserves a quantity of resources of a given type. For example, a number of ports of a router (or of a card in a router), may be reserved. In that case, the reservation is associated with the parent object, i.e. the router or card, and specifies the number of resources of that type being reserved (but not which resources specifically are reserved).

A third type of reservation reserves a portion of resource capacity made available by a resource. For example, a physical link may make a certain data capacity or bandwidth available for use by logical circuits. A reservation may then specify that a given quantity of that bandwidth is to be reserved (e.g. 1 Mb/s of an 8 Mb/s link).

The resource manager and resource planner preferably check reservations associated with resources in the inventory when other processes/users attempt to use those resources (for example other planners or service provisioning). The system may either prevent use of reserved resources (in which case the processes attempting to use the resources will fail), or may simply provide a warning that reserved resources are being used. The approach used may vary depending on the process attempting to use the resource and the type of the resource.

Preferably, the system allows a special type of reservation to be created which indicates that a resource will become available in the future (e.g. when a plan is implemented). For example, when resource reservation (see FIG. 6D) is performed for a plan which frees a resource (e.g. removing a card from a slot, thereby freeing the slot), then a reservation object is created and associated with the resource indicating that it will become available. The reservation is of type "pending availability".

Each reservation may have a defined expiry time. This may correspond to the planned implementation time of the plan generating the reservation. In the case of a "pending availability" reservation, this indicates the time the resource will become available.

The reservation of resources from a plan as described above can prevent plans being in contention for resources, and can thus prevent or reduce conflict between plans. Reservation can also be used to prevent other uses of the resources (not via plans), for example use of the resources directly in the operational inventory (e.g. by an operator making direct modifications to the operational inventory).

Plan Dependencies

As mentioned, design records generated for a plan during planning activities are associated with that plan's context. During implementation of a plan, the associated design records are then used to carry out the plan's modifications in the operational context, which represent the operational inventory. An alternative approach would be to merge the plan's partial model with the operational inventory's network model. However, this approach can be complex, and difficulties can arise if the operational model has changed since the plan was created. The use of design records allows the changes made by the planner to be replicated in the operational model, as if the planner were attempting to make those changes directly to the operational model. If application of a design record fails, this means that the plan is not or no longer compatible with the operational inventory (this is exploited by the validation functionality described above).

Instead of applying a plan to the operational inventory to implement the planned changes in the operational inventory, one plan may also be applied to another plan. Specifically, design records from one plan may be applied to the other plan's partial copy of the network model. This allows plans to be defined in a modular fashion. Dependencies between plans may be explicitly specified when plans are created.

For example, a first plan may specify addition of a card to a slot in a router. That slot may, however, currently be occupied by another card. A second plan may therefore specify removal of the existing card from the router. When creating the first plan, the planner specifies that the first plan is dependent on the second plan.

When the planner specifies such a dependency, the system extends (if necessary) the scope of the first plan to include the scope of the second plan (i.e. the first plan will include all the model objects of the second plan, together with any additional model objects specified in the scope of the first plan). Additionally, once the first plan has been populated with model data (i.e. copies of the model objects), the design records from the second plan are applied to the first plan. This implements the changes made in the second plan into the first plan.

Continuing the above example (which corresponds to the example of FIG. 7) the following steps are carried out:

1. The planner creates a new plan, Plan A. This corresponds to plan 702 of FIG. 7. In this plan, the planner intends to model addition of a card 706 to node 212. The scope of the plan is shown as 704.
2. The planner specifies that the plan is dependent on another plan, plan B. That plan defines removal of a card currently occupying a needed slot (slots are not shown in the example models of FIGS. 2B and 7 but would also be modelled).
3. The system creates Plan A by copying the relevant model objects from the operational inventory. The operational inventory still shows the required slot as being occupied by a card.
4. The system then applies the design records from Plan B, defining removal of the card, to Plan A. This modifies Plan A's partial network model to Plan B's planned state of the network, in which the slot is no longer occupied.
5. The plan is now created and ready for use.
6. The planner specifies addition of new card 706 to Plan A's network model, using the freed slot. Design records relating to this change are created and associated with Plan A.

Plan A can then be implemented in the operational inventory by applying the design records from both Plan A and Plan B into the operational inventory (with Plan B's design records implemented first).

Plans (including dependent plans) may be associated with scheduled implementation dates. Plan dependencies together with scheduled plan implementation dates can be used to ensure that activities are carried out in the correct order. By analysing plan dependencies and implementation dates, conflicts can also be detected. The reservations feature can also help in analysing dependencies and identifying potential conflicts, e.g. where plans attempt to use the same resource, or attempt to use a resource which is not scheduled to become available until a date which is later than the plan's implementation date.

What-If Analysis

Plans need not necessarily be implemented in the actual network. Instead, plans can simply be used to explore the effects, requirements and/or costs involved in modifying the network in a certain way. As one example of this, the system preferably supports the use of multiple plans to model alternative options for future network configurations. For example, Plan A might connect two nodes together over microwave links and Plan B might use a leased line. Both plans can coexist within the model. Based on relative cost, or another mechanism, a decision can be made which plan to proceed with.

Once one of a set of alternative plans has been chosen, it can then be implemented in the usual way (i.e. validating against operational inventory, reserving resources in operational inventory, implementing changes in the network, updating operational inventory).

Planning Scenarios

Some typical planning scenarios of how the resource management and planning system may be used will now be described.

Figure 8A:
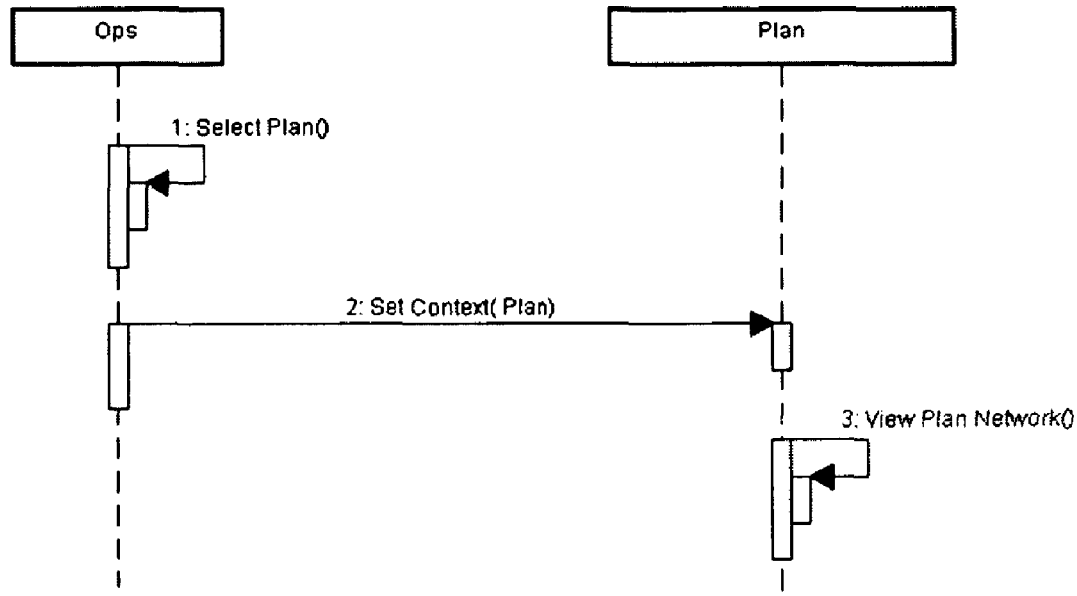
FIGS. 8A-8G illustrate various usage scenarios relating to the network management and planning system.

FIG. 8A is a sequence diagram for a use case for viewing a plan from the operational context:
 1. The operator selects a plan
 2. The working context is set to the selected plan
 3. The operator views the network model for the selected plan.

Figure 8B:
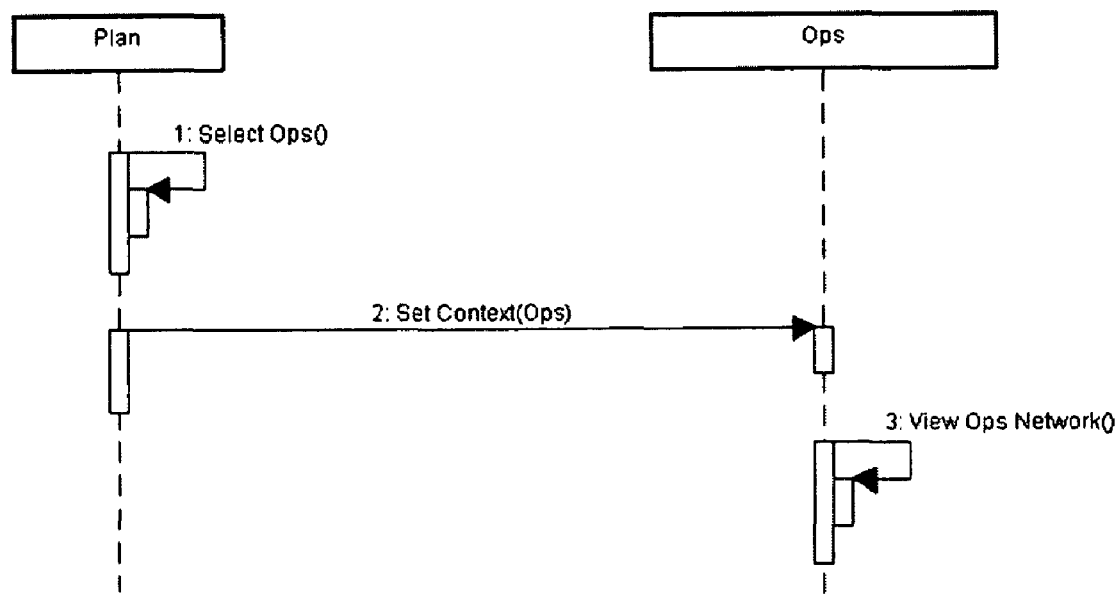

FIG. 8B is a sequence diagram for a use case for viewing the operational context from a plan:
 1. The operator selects "Operations"
 2. The working context is set to "Operations".
 3. The operator views the operational network inventory.

Figure 8C:
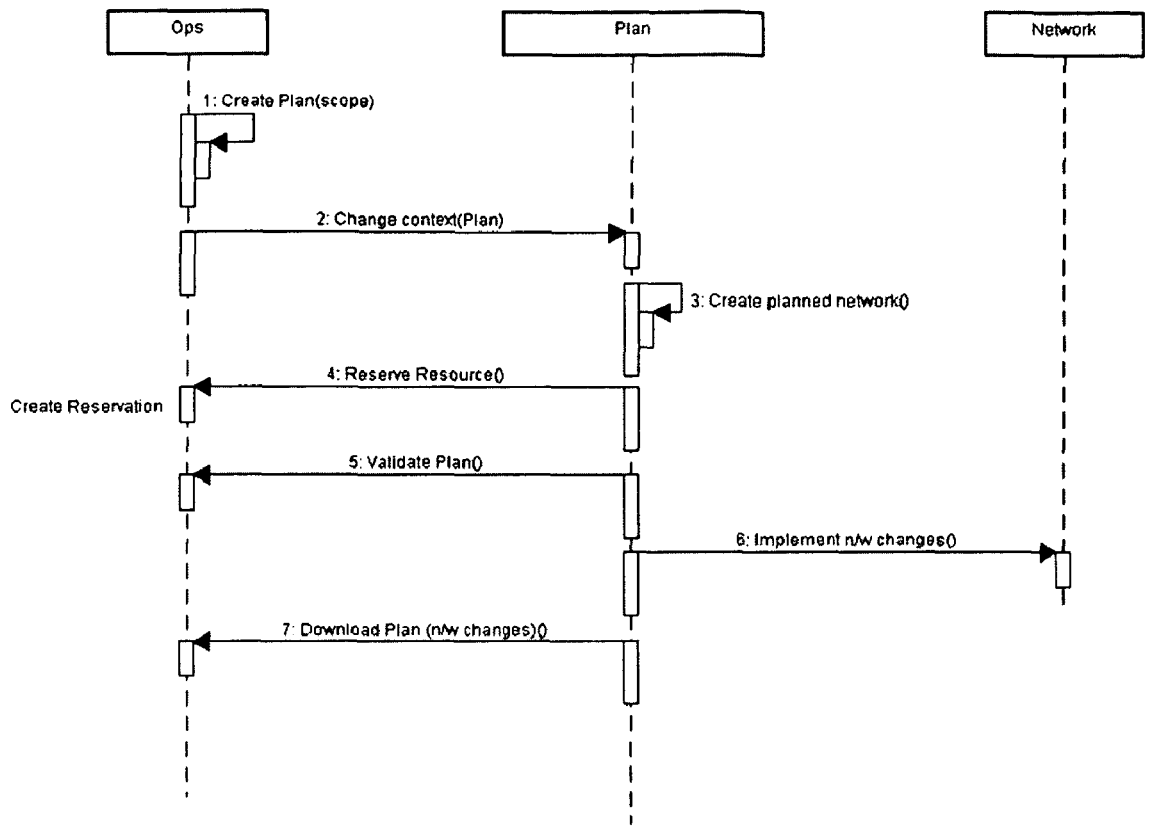

FIG. 8C is a sequence diagram for a use case for a network planning activity:
 1. From the operational context, the operator creates a plan, specifying its scope (i.e. the subset of the operational inventory to be copied into the plan)
 2. The working context is changed to the new plan
 3. The operator carries out the planning activity, e.g. to define new network resources or modify existing ones
 4. The resources required for implementation are reserved in the operational inventory
 5. The plan is validated against the operational inventory
 6. The planned network changes are implemented in the physical network
 7. The plan is downloaded to (implemented in) the operational inventory In the above example, the network changes are implemented in the network first, before the operational inventory is updated to reflect the changes (preferably only once confirmation has been received that the changes have been carried out successfully in the physical network). This ensures that the operational inventory reflects a correct, working configuration of the network. If one or more changes to the physical network are unsuccessful, the changes can be rolled back, without the operational inventory being affected. This also prevents other processes from attempting to make use of resources or configurations in the network that have not yet been installed. However, alternatively, the operational inventory could be updated prior to, or currently with, configuration of the physical network.

Figure 8D:
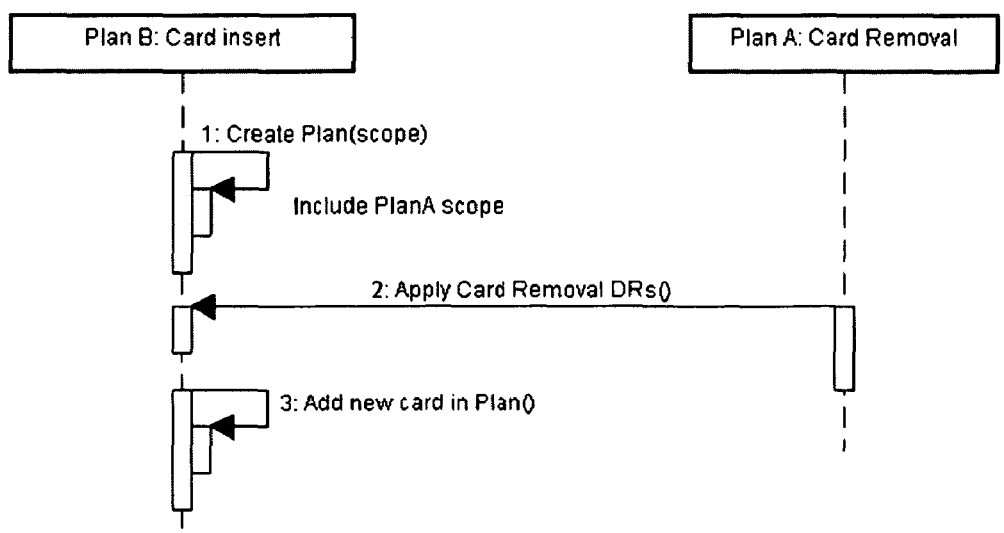

FIG. 8D is a sequence diagram for a use case for managing planning project dependencies:
 1. A new plan (Plan B) is created, and is specified to be dependent on another plan (Plan A). For example, plan A may represent removal of a card from a router, with plan B representing insertion of a new card into the slot vacated by the original card. Together, the two plans thus represent replacement of a card, e.g. due to a fault or to provide improved capabilities. The scope specified for the new plan, Plan B, is extended so that it also includes the scope of plan A.
 2. As Plan B depends on Plan A, the design records from Plan A are applied to (implemented in) Plan B, i.e. the modifications defined by Plan A's design records are carried out in the context of Plan B. Thus, the modifications are carried out on Plan B's copies of the relevant model objects. This implements Plan A in the context of Plan B. In the current example, the plan B model is updated to reflect removal of a card.
 3. The operator then carries out further modifications in the context of Plan B, in the present example to model the addition of a new card in place of the previously removed one.

Figure 8E:
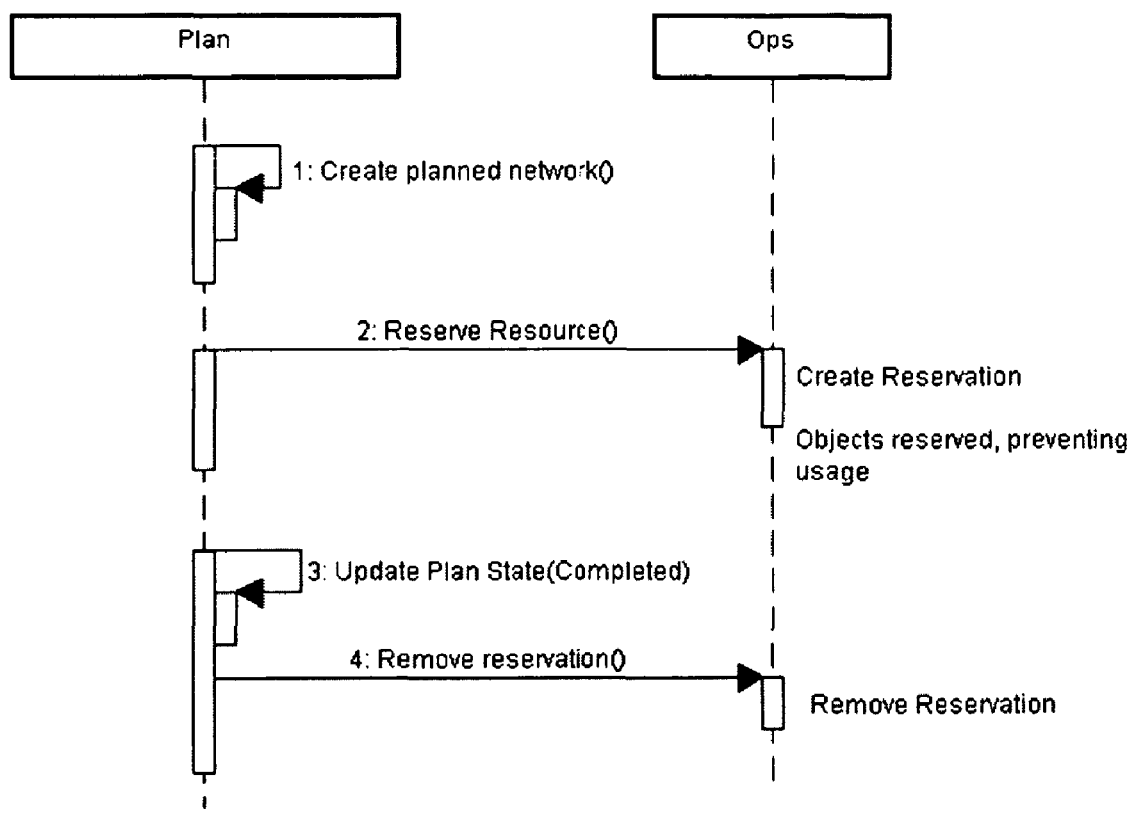

FIG. 8E is a sequence diagram for a use case for reserving resources, using the reserved resources, and finally releasing/removing the reservations:
 1. The operator defines planned network resources/resource modifications (in the context of a plan).
 2. The resources required to implement the plan are reserved in the operational inventory, by creating reservation objects associated with resource objects in the inventory. This prevents usage of the reserved resources.
 3. Later, after having been implemented, the plan is marked as completed
 4. The reservation objects in the operational inventory are deleted.

Alternatively, the reservations may be deleted during implementation of the plan.

The above process may also apply if a plan is discarded without being implemented.

Figure 8F:
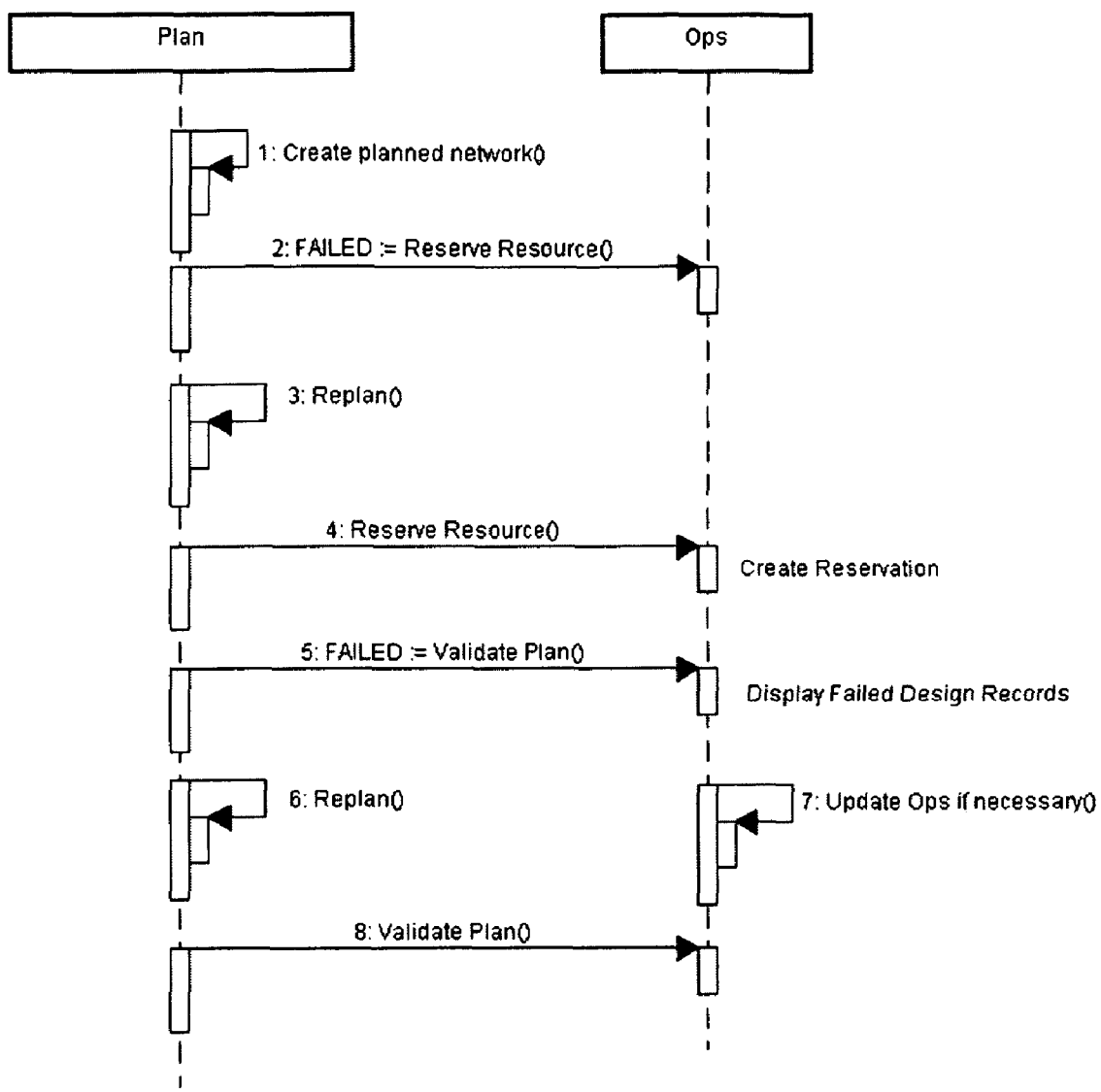

FIG. 8F is a sequence diagram for a use case for resolving discrepancies between a plan and the operational inventory.
 1. Planned inventory changes are modelled in a plan.
 2. An attempt is made to reserve resources for the plan but fails (typically because one or more resources are unavailable)
 3. The planner modifies the plan (e.g. to add needed resources to the network)
 4. A further attempt to reserve resources is successful
 5. An attempt is made to validate the plan but fails. The failed design records are displayed.
 6. The planner makes further changes to the plan
 7. The operational inventory is updated
 8. The plan is successfully validated against the operational inventory.

Figure 8G:
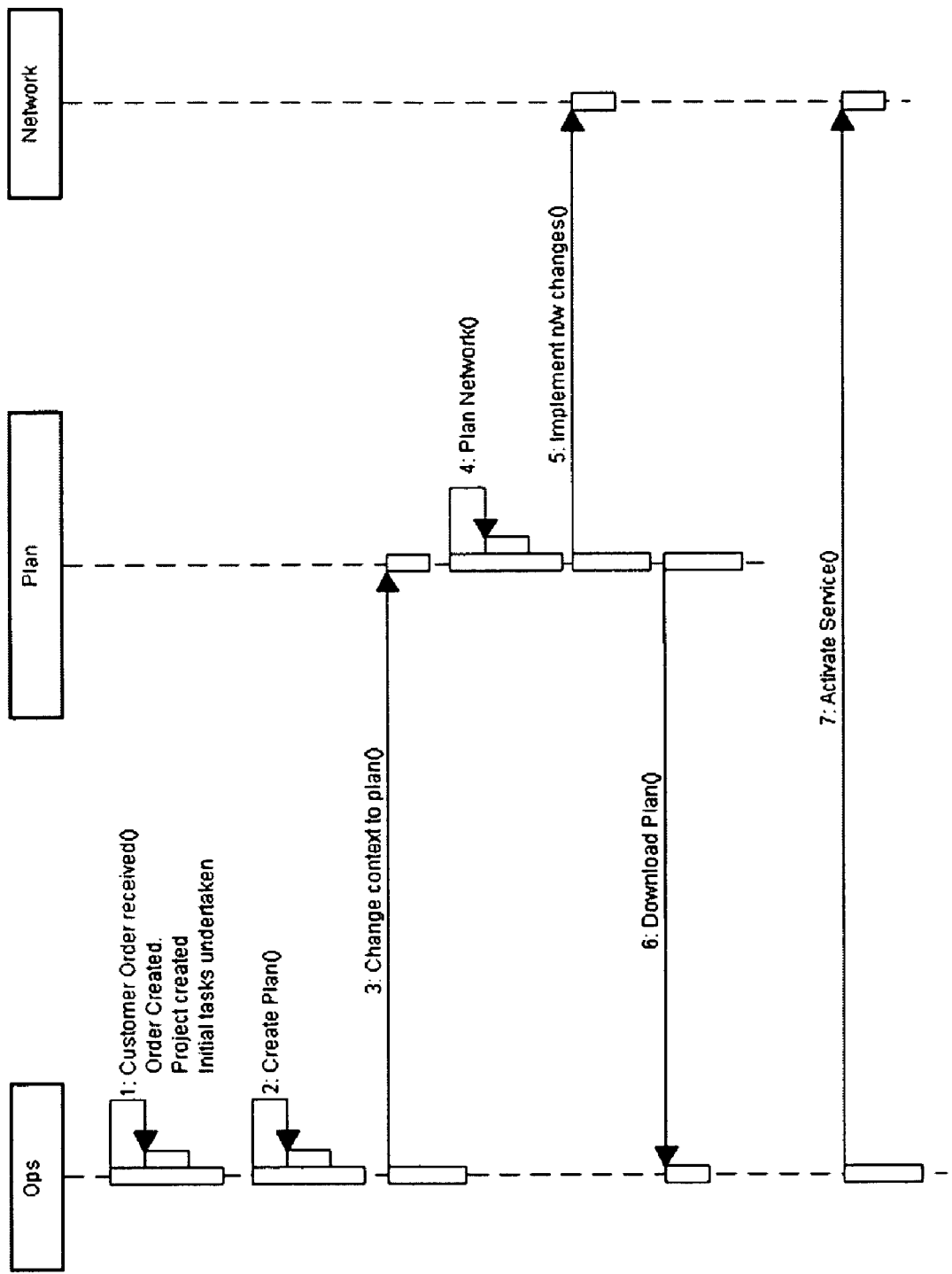

Planning may typically be performed in order to extend a network's capabilities, for example in anticipation of future service needs. Additionally, service provisioning for complex services may also include a planning component, for example where new equipment is required to deliver a service (in addition to an activation component e.g. device configuration). FIG. 8G is a sequence diagram for a use case for provisioning a complex service.

1. A new customer order is received
2. A plan (with an appropriate scope) is created
3. The working context is changed to the newly created plan
4. The operator plans the network changes required for fulfilment of the customer's order
5. The network changes are implemented in the network (e.g. installation of customer premises equipment)
6. After confirmation is received that the necessary physical network changes have been made, the plan is implemented in the operational inventory
7. Finally, the new customer service is activated in the network (e.g. by configuring relevant network devices)

Validation and/or reservation may also be performed in the above example as previously described once a plan has been defined.

Detailed Example

The planning system has been described above in general terms. Various features will be described below in more detail in the context of a specific embodiment. In the following, the operational context of the inventory will be referred to simply as "Operations". Other contexts will be referred to as "plans". The scope of a plan is the subset of the operational inventory included in that plan (i.e. a set of model objects and their interrelationships).

In this embodiment, the planning functionality is provided as an optional add-on to a main resource manager application. On its own, the resource manager allows management of the operational inventory only. The planning add-on adds the context-based approach described above in which the inventory is divided into the operational context and a set of planning contexts. Resource manager user interfaces and APIs are extended as needed to allow switching between contexts, creation of new plans and the various other functions already described above.

The solution as a whole is referred to as Plan Management. Various features of Plan Management are described below.

In this embodiment (as also described above), a single Resource Manager inventory support planning activities through the creation of plans, the reservation of resources, and the separation of plans from operations.

External Interfaces into and out of the inventory operate against operations or plans, as shown FIG. 5. Assurance, activation, discovery and configuration management interfaces act against the operational inventory. Planning Engine high level plans, certain Assurance repair functions and Workforce activities are driven directly from plans.

Plans are created from the operational network, and are the vehicle through which planned network changes are made. Plans may be validated against the operational network, and may reserve resources in the operational network. Planned changes are passed into operations from the plan, preferably post implementation in the network.

Various concepts underlying this architecture are discussed in the sections below.

Plans

Plans are the key object within Plan Management. A Plan is used as the environment within which planner conducts the following actions,
- define the scope of interest: the objects of relevance to a planner in a given activity
- provide a view of inventory of just the objects within the scope of interest
- reserve capacity within the operational inventory
- capture design changes
- validate design changes against the operational inventory
- implement design changes
- update changes to the operational inventory
- manage plan dependencies using reservation and due date information Plans may be created directly in the Plan Wizard and deleted via the Delete Wizard.

Reservations

Reservations are introduced as part of Resource Manager, but utilized by Plan Management.

Reservations are made to prevent a resource being used while there is intended deletion or usage elsewhere in the system, or to flag an object as coming available for use. The two key uses of reservation are for planning and for feasibility requests during operations activities.

Reservations may lapse after a defined time period.

Reservations preferably only exist within the operational context, though will be created from other contexts.

Reservations may be created directly in the Reservation Wizard and deleted via the Delete Wizard.

Contexts

A Context defines a set of inventory objects with which a user can interact at any one time.

The following contexts are defined:
- Multiple Plan contexts in which to conduct planning activities
- A single Operational context. Where no context is specified, the operational context is the default (this allows existing interfaces to operational inventory to be maintained).

Contexts have the following behaviours:
- The system is in a single context at a given time (although specific reports or activities may cross context).
- A context provides a self-consistent view of network.
- Contexts can be changed through the user interface. Specifically, context may be changed by selecting a Plan or the Operational Context (e.g. via right click)
- Contexts coexist within a single Resource Manager instance.

Each Plan has a defined context and is used for capturing planned network changes and assurance repair processes.

The Operational Context provides a current picture of live services and network. It is used for supporting activation, service assurance and data integrity management. Discovery and Synchronization from the live network are also implemented into the Operational Context.

Fulfilment activities can be split across both contexts—preferably, pure activation is undertaken directly on the operational context, whereas any activities which are of a longer timeframe (greater than 1 hour, for example, or require manual build/configuration) are preferably planned in a Plan before being activated in the operational context. However, the system preferably provides the flexibility to allow any kinds of changes to be implemented either via a plan or directly in the operational inventory.

Inconsistent Plan Events

An Inconsistent Plan Event is a standard Resource Manager Event of type Inconsistent Plan.

Inconsistent Plan Events are generated to allow the Operational Context visibility of failed updates of completed planned changes from a Plan and failed application of updates from other plans.

Inconsistent Plan Events are related to the Objects whose design records failed in a given API call, and that Design Record.

Projects

Projects are visible across contexts but may be related to a parent plan.

There are two main modes of operation of projects within plan management.

The primary mode is for projects to act within a parent plan to split the work into manageable units. If this is the case, the project is associated to a parent plan. A Project may be used as the holder of Design Records to be validated against the Operational Context. It may also be used to issue Design Records to the Operational Context once completed, or to other plans.

The secondary mode is that a global project may span operations and plans. For example, a design project might have some steps in operations which generate a plan, a task that changes context to that plan, and subsequent tasks within the plan. In this case, there is no relationship between the project and the plan.

Dependencies

Plans may encompass work that is dependent on work in a different plan. Where two different plans touch the same object, there is a dependency between those plans. Example dependencies are given below, Shared location: Two pieces of work are planned at the same location. The dependency here is important, as it may be possible to cover both of these activities in a single truck roll.

Shared consumed resource: A removal must occur before an insertion into a common consumed resource (e.g. remove card A, add card B).

Resource Contention: An addition in Plan A prevents an addition in Plan B (e.g. Card insert in Plan A and card insert in Plan B)

Reservations provide the mechanism to deal with plan conflicts due to resource contention. Pending available reservations are the mechanism to deal with shared consumed resource.

Project dates may be relevant to dependencies, in that they provide a mechanism to understand where problems may occur. For example, if a user finds dependent projects via reservations, he can reorganize them based on date, so that a predecessor has to complete before a successor project.

Contextual Behaviour of Objects

Objects may be defined as contextual—visible within a single context, or global—visible across contexts.

Contextual objects include, for example, network model objects (e.g. Nodes, Locations, Circuits, Services), Design Records, and Reservations (operational context only, though created from any context). Global objects include, for example, Plans, Events, and Projects.

Cross-Context Components

The new components that are available irrespective of Context are as follows:

Wizards
Reservation Wizard (introduced as Part of Resource Manager Reservation Management)
Validate Plan Wizard—trials elements of a network plan on the target Context
Apply Plan Wizard—applies Design Records from one context to another
WebReports
Bulk Plan WebReport—Listing of plans with key data (can be run from any Plan)
Plan Jeopardy WebReport—Listing of plans whose dates have past or are due to pass (can be run from any Plan)
Resource Manager Project Summary WebReport—provides project summary including planning status and validation date (this report can summarize across contexts and is run from within a Project)

Operational Context Components
The components visible in the Operational Context are as follows
Wizards
Plan Wizard
Plan Components
The components visible in a Plan's Context are as follows,
Wizards
None
WebReports
Plan Summary WebReport Modelling of Plans This section provides details of the data representation used to model plans in the database in the example embodiment. Any other suitable data representation may be used.

Figure 9:
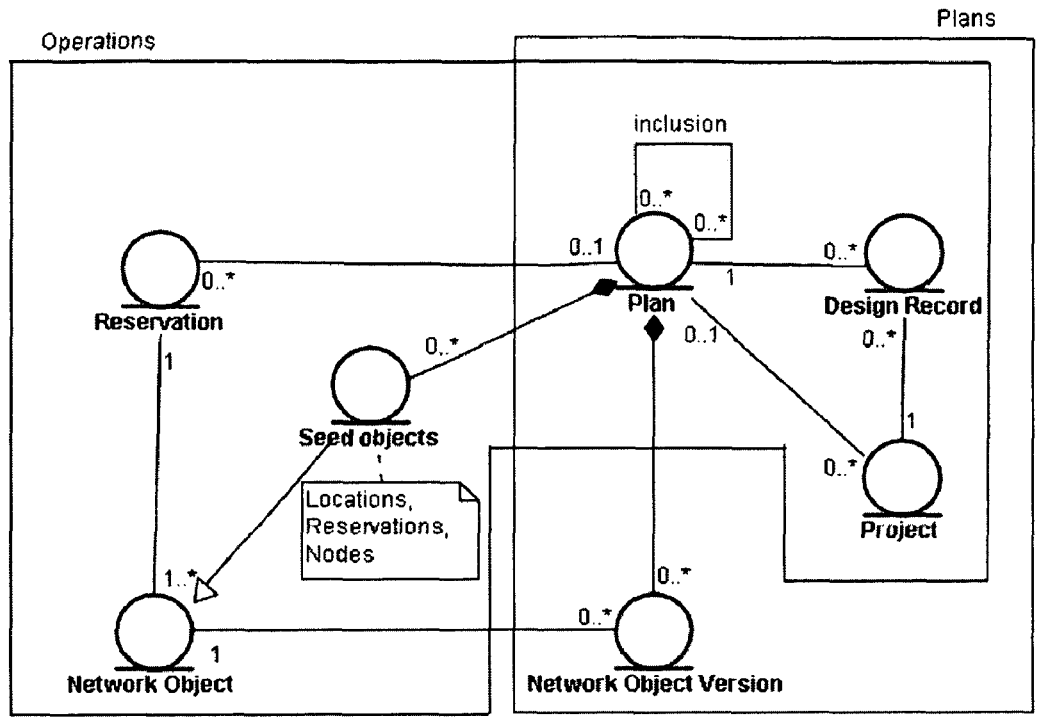
FIG. 9 illustrates a data model for the network management and planning system.

FIG. 9 illustrates an example class diagram for representing Plans and related information. It shows the main objects involved in Plan Management. The operations environment holds the operational Network Objects and Reservations. The Plan is spawned from the operational Network Objects and is composed of Network Object Versions.

Design Records are specific to a context (which can be the Operational context or a plan).

Plans are created within the operational context. They may be created by defining the plan content, and scheduling the population of the plan.

The scope of a plan is defined in terms of seed objects and filters. Seeds are starting objects for an object tree walk, and may typically be locations, devices or reservations. Filters specify object classes and types.

A set of plans which are to be included in the new plan may also be specified. Unless a plan is to be populated instantly, a scheduled date and time for populating the Plan may also be specified. At the specified time, data is then copied into the plan from the operational inventory (by creating copies of the model objects that are within the defined scope). This is done by performing a tree-walk through the model starting at the seed objects, in accordance with any filters specified (and any other generally applicable constraints).

Plans may have type. A plan name may be manually specified or may be automatically generated by a configurable naming callout (for example, a standard naming Callout may be provided to generate a name of the form 'PlanTypeName_<Sequence>').

Plans may have standard core attributes (specified in the plan model object) and extended attributes (specified in separate attribute objects associated with the plan object). Date attributes may be provided to specify a population date (date/time population scheduled or actually started), a plan availability date (date/time population finished and so plan is available for use), and planned and actual start and finish dates for implementation of the plan.

Design Records (e.g. from another plan) may be applied to a plan if the objects to which the design records relate are within the scope of the plan. If application of a Design Record fails, an error event is generated. Plans may be related to Projects to support date checking. Plans may also include other plans. Thus, for example:

A Plan may have zero or more projects
A Project may have zero or one plan associated
Plans may include other Plans if dates allow
Plans may include more than one plan
Plans may be included in more than one plan
The Plan definition may include scope from existing plans
Design Records from these existing plans may be applied into the new plan A plan is related to the included plan A Plan may not include itself Plans have metastates of Created, Populating, Available, Closed, Deleting and PopulationFailed. The "Created" state implies that the Plan seeds have been defined, but the scheduled population date has not yet arrived. The "Populating" state implies that the Plan is being populated with objects. The "Available" state implies that the plan has been populated and is available to use as a basis for planning. The "PopulationFailed" state implies that the plan population failed and was rolled back. The "Closed" state implies that the plan is defunct, and prevents the user from setting it as the working context. The "Deleting" state implies that the plan deletion has begun. This also prevents the user from setting it as the working context. The "DeletionFailed" state implies that the plan deletion failed and was rolled back.

Figure 10:
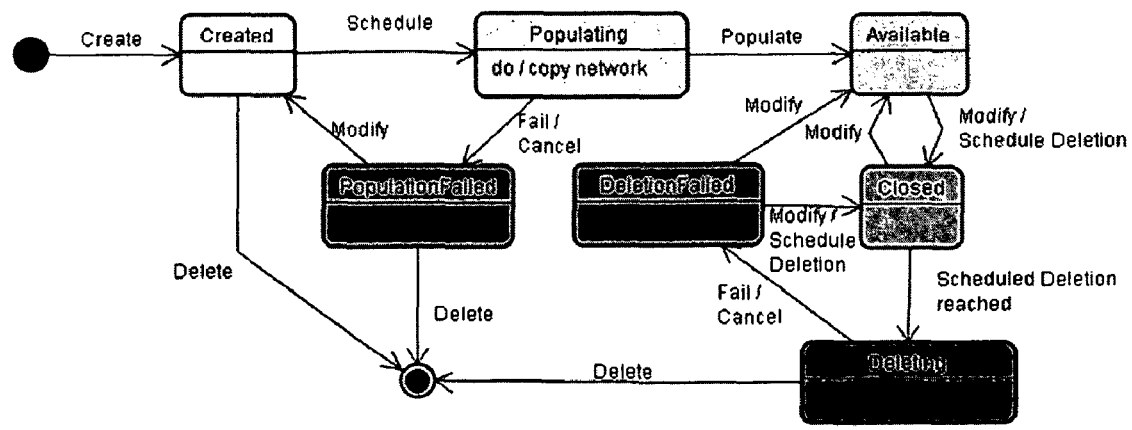
FIG. 10 illustrates different states of a plan.

FIG. 10 is a state transition diagram summarising the above states. The diagram illustrates how the state of a plan changes as it is created, is populated with data, becomes available for use by the planner, is closed (e.g. because it has been implemented or is no longer needed), and is finally deleted.

User Interface

As mentioned previously, existing resource manager user interface components (as described above) are adapted to operate in the context-based inventory. By simply changing the working context, the operator can use these user interface components to view and modify network models either in the operational context or in a plan context.

In addition, a number of planning-specific user interface components may be provided. Several planning-related wizard-style user interface components will now be described by way of example. Wizard-style user interfaces take the user through a process or activity in a clear step-by-step/screen-by-screen fashion.

Plan Wizard: The "Plan Wizard" is provided for creating and modifying a Plan. The wizard is preferably invoked from the operational context. When creating a plan, another plan may optionally be specified, the scope definition of which is copied into the new plan.

A typical flow of events is as follows (they main numbered steps below preferably correspond to individual wizard pages):

1. User selects Plan Wizard
   i. User selects Create/Modify/Create based on
   ii. Modify and Create based on take a Plan as input
2. User selects Plan Type
   i. Already populated if Create based on or Modify
3. User specifies other Plans for inclusion.
   i. Already populated if Create based on or Modify
4. User specifies Scope seed objects. Scope defined as set of locations, devices, reservations. Already populated if Create based on or Modify. If a plan is selected, its seed objects are included in the scope.
   i. Scope includes all contents of location (or device)
   ii. Scope includes only links and circuits terminating on objects in scope
5. User specifies filter. The filters must include the subset from the included plans. Already populated if Create based on or Modify.
   i. Object class
   ii. Object type
6. User selects Design Records to apply
7. User specifies attributes and status
   i. Already populated if Create based on or Modify
   ii. Plan name created from a configurable naming callout
      I. Name uniqueness is validated
   iii. Statuses are limited by allowed metastatus transitions
   iv. Changing of the Planned Start Date and Planned Finish Date should validate that any contained projects' Planned Start Date and Planned Finish Date remain bounded
      I. A warning should be issued if this is not the case
8. User specifies population date/time (optional)
   i. The user can unset a current schedule, for example by setting the schedule date to null
9. System displays summary page
10. User completes Wizard
    i. User may select 'Continue-on-confirm' to return to first page of the wizard. If so, type and mode of wizard operation must be pre-populated
11. System creates Plan object
    i. In 'Created' state until schedule date reached
12. System starts population of the Plan
    i. In 'Populating' state
13. System completes generation of the Plan and associated event
    i. In 'Available' state
    ii. PlanPopulatedEvent created, associated to Plan
    iii. AvailableOn date set If the wizard is used to modify an existing plan which is already populated, pages 2-8 of the wizard may be skipped. Preferably, the wizard does not allow a Plan to be modified if it is in the "Deleting" or "Populating" state. The wizard preferably also provides an alert if the name assigned to the plan is not unique and asks the user to specify an alternative name. If creation of the plan fails, the plan status is set to 'PopulationFailed', and an error event is created and associated with the plan.

Another typical use case is the deletion of a Plan in the Plan Wizard. The plan wizard is again invoked from the operational context:

1. User selects Plan Wizard
   i. User selects Plan
2. User specifies Schedule date/time (optional)
   i. The user can unset a current schedule, for example by setting the schedule date to null
3. System displays summary page
4. User completes Wizard
   i. User may select 'Continue-on-confirm' to return to first page. If so, type and mode of wizard operation must be pre-populated
5. System changes Plan state to 'Closed', if was 'Available' or 'DeletionFailed'
6. System starts deletion of the Plan at scheduled time
   i. System sets Plan to 'Deleting' state
7. System completes deletion of the Plan
   i. System generates PlanDeleted event Preferably, the wizard does not allow a Plan to be deleted if it is in the "Deleting" or "Populating" state. If deletion fails (for example, because another user is using that context), the plan status is set to the 'Deletion Failed' state, and an error event is generated, containing the reason for the failure Apply Plan Wizard: The system further provides the "Apply Plan Wizard" for applying a plan to a target context (which may be the operational context). The wizard may be used to apply a plan immediately or may be used for scheduled, asynchronous action. It offers the user the ability to select a set of Design Records for application in the target context.

The Apply Plan Wizard can be used to download completed, planned network changes to the Operational Context, or to pass Design Records between Plans. To ensure that duplicated design records are not applied to the network or passed into operations, the option to delete Design Records after applying the change is provided.

Unapplied design records may also be passed. This is useful where the reservation in Operations is made based on an unapplied design record that can then be applied in the plan.

The wizard operates at the granularity of individual Design Records, but will typically be driven from Plans or Projects as a grouping of all contained Design Records. Where a parent project is chosen, all of the Design Records are included from the children projects.

The flow of events is as follows,
1. Specify target context (Plan or Operations)
    i. if a Plan is the target, the wizard pulls Design Records from other plans or Operations into the current plan context
    ii. If Operations is the target, the wizard pushes Design Records from the current plan context to Operations.
2. Specify Scope
    i. Allows Selection by Plan (default), or Project
    ii. Select specific Design Records
        Allows cross-contextual visibility within this wizard component
    iii. Specify complete rollback (default) or partial rollback on failure
        Partial: On failure of an individual design record, that design record will be rolled back. The system will continue processing the rest of the design records
        Complete: On failure of an individual design record, the whole process will fail.
3. Summary
    i. Display of list of Design Records—used for confirmation and manipulation for error resolution
        Skip through if errors occur
        Modify (in source system) if errors occur and attempt to resend
    ii. Display Project planning status and last validation date
    iii. Continue on confirm may be selected
    iv. Finish If several Design Records are being applied and an error occurs, the Design Record that has caused the error is highlighted in the Design Records list and a "Skip" button becomes available. The user can click "Skip" to skip that Design Record and to proceed with the others in the list. The Design Record that has caused an error can be modified later by re-running the Design Record wizard within the target context, or by modifying the plan and resending the apply design records (this overwrites the unapplied design record).

An error event is generated if failures occur, associated to the specific design records that failed.

Validate Plan Wizard: The "Validate Plan Wizard" is called to validate the planned network changes from a plan onto the Operational Context.

This wizard is preferably similar or identical to the Apply Plan Wizard described above, except that the changes are rolled back and not committed. A single Apply/Validate Plan wizard implementation may also be provided. Plan validation is described in more detail above.

Archive Plan Wizard: The "Archive Plan Wizard" provides a mechanism to store or retrieve plans from an offline Resource Manager, or in an XML file or other archiving format.

In addition to the wizards described above, other user interface components may also be provided for viewing, modifying and reporting plan-related information, such as home pages, relations browsers, views and web reports as described above in relation to FIG. 3. For example, a home page may be provided for viewing details of a Plan object and making certain changes (e.g. changing the state of a plan from "closed" to "available" or vice versa). Web Reports may be provided, for example, for providing a summary of a plan or for listing the design records in a plan.

Implementation

The various system components described above may be implemented in the form of application software and database software operating on one or more computing devices such as one or more servers and/or workstations.

Figure 11:
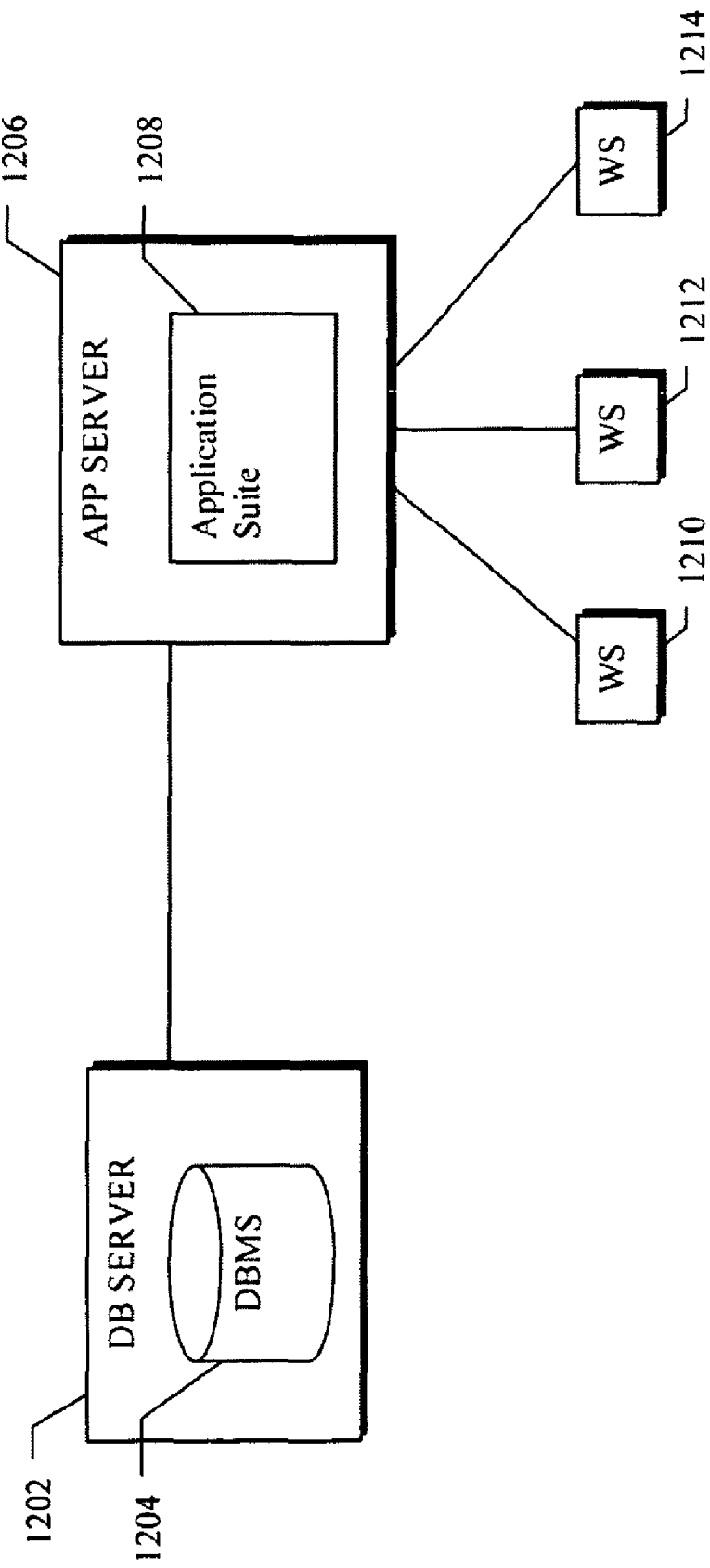
FIG. 11 illustrates major hardware and software components of the network management and planning system.

An example is illustrated in FIG. 11. The network inventory, including operational resource model and plans, and any other relevant data (such as customer data, billing data etc.) are stored in a database at a database server 1202. The database is managed by a database management system 1204 implemented as software running on the database server 1202.

Connected to the database server is an application server 1206. The application server runs an application suite 1208, including the resource manager and resource planner applications described above, along with other applications such as service provisioning applications and the like. The applications are provides as client-server style applications to a number of workstations 1210, 1212, 1214, which include appropriate client software. In one embodiment, the client software on each workstation is in the form of a web browser, with the applications provided as web applications. The workstations are used by network managers, planners, order fulfilment operators and the like to use the application suite 1208 in order to carry out management, planning, service provisioning and other activities. The database server 1202, application server 1206 and workstations 1210-1214 may be interconnected in any appropriate way, for example via a local area network (LAN) or via a wide area network (WAN) such as the Internet.

Figure 12:
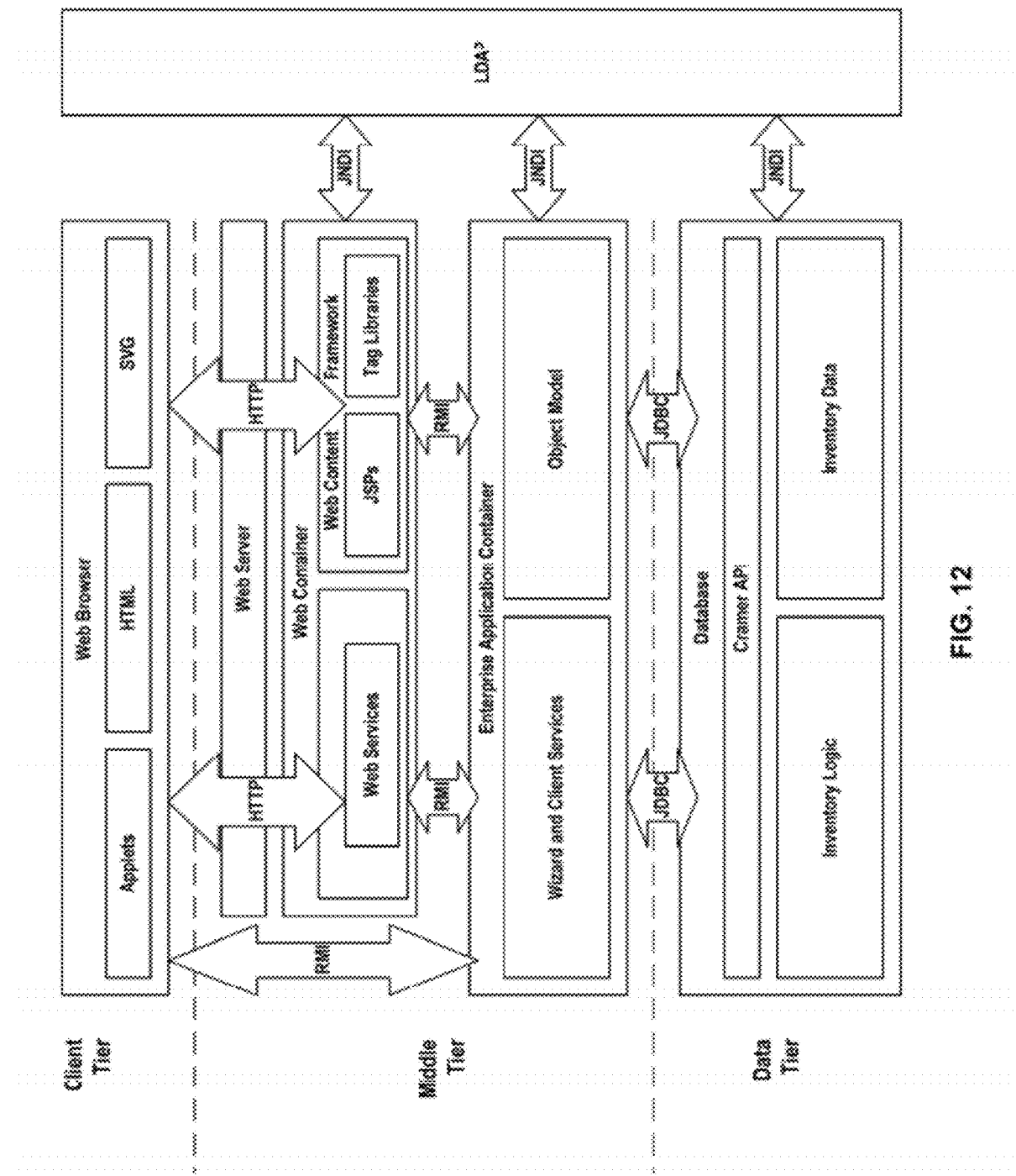
FIG. 12 illustrates the software architecture of the system.

The system's software platform is illustrated in more detail in FIG. 12.

At the core of the system is the Resource Manager which provides inventory management. Resource Manager is an n-tier product that consists of:
    Web browser client
    Middle tier components (Web tier, Business tier)
    Database tier Other parts of the application suite (e.g. the Resource planner) install configuration data and software at some or all the Resource Manager tiers, and operate seamlessly within the Resource Manager framework. For example, a product may provide additional user interface components such as Wizards and WebReports, and will automatically plug these components into the client user interface of the Resource Manager.

The application suite employs a multi-tier architecture in which several tiers of software cooperate to support a client session. Each tier may be installed on one or more separate servers, and communicates with other tiers through industry-standard interfaces.

The tiers are:
    Client Tier. This contains all the components necessary to run the client application, which runs inside a web browser.
    Web Server. This is the gateway to the Web tier, providing secure HTTP communications and static Web content.
    Web tier. This provides both generation of dynamic web content including Homepages, WebReports and Views, and Web-based access to business tier services.
    Business tier. This provides core business components: the Object Model, and services supporting both client components, including wizards, and the web tier.

Database tier. This contains core business data, metadata, and some stored procedures.

In addition, there is a notional tier, the Client Server tier. This is the tier from which the client applets and their supporting structure are downloaded. The Client Server tier functionality is split between the Web Server and the Web tier.

The application suite supports two ways of managing user information and security:

Directly in a centralized LDAP server.

Using a separate security server such as an Amdocs Security Manager security server. In this case, LDAP is still used internally.

The LDAP server, such as the Oracle Internet Directory, provides a central repository of information for the application suite that spans databases, including:

User authentication and authorization
User preferences
System configuration

Embodiments of the invention provide methods and systems for planning, validating and reserving resource for network modifications. The described method can provide the capability to create, manage and visualize deployable network plans while simultaneously satisfying requirements to provide operations and assurance functions.

Embodiments enable planning network modifications utilizing different views in a single system. Plans are spawned from an operational inventory, providing separate planning environments or contexts. The plans can be validated against the operational inventory, reserved in the operational inventory and update the operational inventory. Plans may have dependant precursor plans.

The described approach introduces the following concepts:

Context—a consistent working environment containing a coherent set of network data. Multiple contexts can coexist, to provide different data views for differing purposes.

Plan—one of many contexts for the purpose of a given planning activity.

Operations—a single context providing the operational view for assurance and activation functions Reservations—an ability to reserve the operational inventory to warn against or block usage of capacity or resources The mechanism to spawn plans from the operational inventory and maintain all plans in a single system uses a 'copy and hide' approach—a selected scope of data is copied, and visibility is allowed only of a single context (a plan or operations) at a time. The context can be freely changed.

Validation of plans may be made against the operational inventory. Reservations for plans may be stored in the operational inventory, reducing conflict. Changes to a plan may be passed from one plan to another or from a plan to operations. Plans may depend on other plans.

The present solution provides the abilities to build plans based on other plans, to reserve operations from a separate plan, and to retain deployability of the plan. Also, mechanisms to validate, reserve and modify by passing captured deltas in a plan and applying them to operations are also provided. These features can provide significant benefits in terms of efficiency and flexibility.

Preferred embodiments provide a network planning module for use with a network management system, providing a variety of planning functions including:

Planned creation, modification and deletion of network components

Visualization of the changes included in a plan
Use of reservation to reduce plan conflict
Jeopardy management of planned work slippage It will be understood that the present invention has been described above purely by way of example, and modification of detail can be made within the scope of the invention.

The invention claimed is:

1. A method of specifying changes to a communications network, comprising:

storing a network model representing a first configuration of the communications network;

receiving, utilizing a processor, scope information defining a subset of the network model to which changes are to be made;

copying model information relating to the defined subset of the network model in accordance with the scope information, to create a partial model copy;

modifying the partial model copy to represent a second configuration of the communications network;

displaying a user interface for at least one of viewing and modifying network information associated with the communications network, where the user interface is operable in a plurality of contexts, including a first context in which network information relating to the first configuration of the communications network is displayed or modified, and one or more further contexts in which network information corresponding to one or more planned configurations, including the second configuration, of the communications network is displayed or modified, where the user interface provides functionality for switching from a currently active context selected from the plurality of contexts to another of the plurality of contexts; and storing the network information associated with the communications network in a database, where the database associates the network information with context information associated with the plurality of contexts, such that the user interface provides access to view or modify network information associated with the currently active context;

wherein the database hides model objects associated with one or more contexts from database users;

wherein the database is configured to prevent database queries relating to model objects from returning, modifying, adding or deleting hidden model objects associated with the one or more contexts.

2. A method according to claim 1, wherein the first configuration is a current configuration of the communications network.

3. A method according to claim 1, wherein the network model and the partial model copy are stored in the same database in the same database instance.

4. A method according to claim 1, wherein modifying the partial model copy comprises:

receiving information defining one or more modifications to be made to the partial model copy;

implementing the defined modifications in the copy; and storing one or more design records specifying the modifications made.

5. A method according to claim 1, further comprising applying the modifications made to the partial model copy to the network model.

6. A method according to claim 4, further comprising applying the modifications made to the partial model copy to the network model, the applying step comprising modifying the network model in accordance with one or more of the design records.

7. A method according to claim 1, wherein the network model comprises a plurality of model objects representing resources of the communications network; and wherein the partial model copy comprises copies of a selected plurality of the model objects of the network model.

8. A method according to claim 7, wherein the received scope information specifies one or more model objects to be included in the subset, the method comprising including the one or more specified model objects in the partial model copy.

9. A method according to claim 7, wherein the received scope information specifies at least one seed object to be included in the subset, the method comprising:
    identifying one or more model objects associated with the seed object in the network model; and
    including the identified model objects and preferably the at least one seed object in the partial model copy.

10. A method according to claim 1, comprising storing information defining a plan, the plan representing planned changes to the communications network, the plan including or associated with the partial model copy.

11. A method according to claim 10, comprising storing one or more design records specifying modifications made to the partial model copy, the design records being associated with the plan.

12. A method according to claim 10, comprising validating one or more network modifications made in the plan against the network model.

13. A method according to claim 12, wherein validating one or more modifications comprises determining whether the one or more modifications could be successfully carried out in the network model.

14. A method according to claim 10, comprising identifying one or more network resources required for implementing planned changes, and marking the identified resources in the network model as being reserved.

15. A method according to claim 14, comprising preventing use of a reserved resource or providing an alert if use of a reserved resource is attempted.

16. A method according to claim 15, comprising preventing use of a reserved resource or providing an alert if use of a reserved resource is attempted in another plan.

17. A method according to claim 15, comprising preventing use of a reserved resource or providing an alert if use of a reserved resource is attempted in the network model.

18. A method according to claim 10, comprising receiving information specifying a further plan, and including model information relating to a subset of the network model in the plan in accordance with scope information relating to the plan and scope information relating to the further plan.

19. A method according to claim 18, further comprising, after copying model information to create the partial model copy, identifying network changes made in the further plan, and applying the identified changes to the partial model copy of the plan.

20. A method according to claim 19, further comprising implementing the changes represented by the plan in the network model, the implementing comprising accessing first design records defining modifications made in the plan and second design records defining modifications made in the further plan and carrying out the modifications defined in the first and second design records in the network model.

21. A method according to claim 10, comprising implementing the changes defined in the plan in the communications network.

22. A method according to claim 21, wherein implementing the changes comprises at least one of: installing equipment, Modifying installed equipment, performing manual configuration of equipment, and transmitting configuration information to one or more network devices to perform automatic configuration of the network device(s).

23. A method according to claim 1, wherein the network model and the partial model copy are associated with respective model context identifiers, the method comprising limiting access to model information based on the model context identifiers, preferably to provide access only to model information associated with a specified context.

24. A method of planning changes to a communications network, comprising:
    storing a network model comprising a plurality of model objects representing resources of the communications network;
    storing a plan representing planned changes to the network, the plan comprising copies of a selected subset of model objects;
    modifying, utilizing a processor, the model object copies in the plan to represent a planned configuration of the network;
    storing design records specifying the modifications made and associating the design records with the plan; and
    implementing the plan in the network model, the implementing comprising modifying the network model in accordance with the stored design records;
    displaying a user interface for at least one of viewing and modifying network information associated with the communications network, where the user interface is operable in a plurality of contexts, including a first context in which network information relating to an operational configuration of the communications network is displayed or modified, and one or more further contexts in which network information corresponding to the planned configuration of the communications network is displayed or modified, where the user interface provides functionality for switching from a currently active context selected from the plurality of contexts to another of the plurality of contexts; and
    storing the network information associated with the communications network in a database, where the database associates the network information with context information associated with the plurality of contexts, such that the user interface provides access to view or modify network information associated with the currently active context;
    wherein the database hides model objects associated with one or more contexts from database users;
    wherein the database is configured to prevent database queries relating to model objects from returning, modifying, adding or deleting hidden model objects associated with the one or more contexts.

25. A method according to claim 24, further comprising implementing the plan in the communications network, the implementing comprising modifying the communications network in accordance with the stored design records.

26. A method of validating planned modifications to a communications network, comprising:
    accessing, utilizing a processor, first model data representing a first configuration of the communications network;
    receiving planning data comprising:
        second model data representing a second configuration of the communications network; and
        design records specifying changes made to the second model data;
    processing one or more of the design records to determine whether the first model data can be modified in accordance with the one or more design records;

displaying a user interface for at least one of viewing and modifying network information associated with the communications network, where the user interface is operable in a plurality of contexts, including a first context in which network information relating to the first configuration of the communications network is displayed or modified, and one or more further contexts in which network information corresponding to the second configuration of the communications network is displayed or modified, where the user interface provides functionality for switching from a currently active context selected from the plurality of contexts to another of the plurality of contexts; and storing the network information associated with the communications network in a database, where the database associates the network information with context information associated with the plurality of contexts, such that the user interface provides access to view or modify network information associated with the currently active context;

wherein the database hides model objects associated with one or more contexts from database users;

wherein the database is configured to prevent database queries relating to model objects from returning, modifying, adding or deleting hidden model objects associated with the one or more contexts.

27. A method of processing planning data defining planned modifications to a communications network using a network model representing the communications network, the method comprising:

receiving, utilizing a processor, planning data defining planned modifications to the communications network, the planning data comprising:

a modified copy of a portion of the network model, modified to represent a planned configuration of the communications network, and design records specifying the modifications made;

identifying one or more network resources in the network model required for implementation of the planned modifications;

associating reservation information with the identified resources in the network model to mark the resources as reserved;

displaying a user interface for at least one of viewing and modifying network information associated with the communications network, where the user interface is operable in a plurality of contexts, including a first context in which network information relating to an operational configuration of the communications network is displayed or modified, and one or more further contexts in which network information corresponding to the planned configuration of the communications network is displayed or modified, where the user interface provides functionality for switching from a currently active context selected from the plurality of contexts to another of the plurality of contexts; and storing the network information associated with the communications network in a database, where the database associates the network information with context information associated with the plurality of contexts, such that the user interface provides access to view or modify network information associated with the currently active context;

wherein the database hides model objects associated with one or more contexts from database users;

wherein the database is configured to prevent database queries relating to model objects from returning, modifying, adding or deleting hidden model objects associated with the one or more contexts.

28. A communications network management system comprising:

a processor;

a database for storing a network model comprising a plurality of model objects representing network resources, wherein given model objects are associated with context identifiers, a context identifier identifying one of a plurality of contexts with which a respective model object is associated, wherein a first of the plurality of contexts is an operational context, the portion of the network model associated with the operational context representing a current configuration of the communications network, and wherein one or more further contexts of the plurality of contexts are planning contexts, the portion of the network model associated with a planning context defining a planned configuration of the communications network; and a user interface for at least one of viewing and modifying network information associated with the communications network, where the user interface is operable in the plurality of contexts, including the first of the plurality of contexts in which network information relating to the current configuration of the communications network is displayed or modified, and the one or more further contexts of the plurality of contexts in which network information corresponding to the planned configuration of the communications network is displayed or modified, where the user interface provides functionality for switching from a currently active context selected from the plurality of contexts to another of the plurality of contexts;

wherein the system is configured to limit access to model objects based on the context identifiers;

wherein the database associates the network information with context information associated with the plurality of contexts, and the user interface provides access to view or modify network information associated with the currently active context;

wherein the database hides model objects associated with one or more contexts from database users;

wherein the database is configured to prevent database queries relating to model objects from returning, modifying, adding or deleting hidden model objects associated with the one or more contexts.

29. A system according to claim 28, wherein the system is configured to prevent access by at least one system component to the model objects associated with the one or more contexts.

30. A system according to claim 29, wherein the system prevents at least one component of the system from accessing model objects in any context other than the currently active context.

31. A system according to claim 28, wherein a given planning context corresponds to a subset of the operational context's network model.

32. A system according to claim 31, wherein the given planning context comprises a copy of the subset of the operational context's network model, modified so as to define planned modifications to the communications network.

33. A system according to claim 28, wherein the database is configured to modify queries dynamically to limit query results to one or more non-hidden contexts.

34. A system according to claim 28, wherein the database modifies queries dynamically to limit query results to the currently active context.

35. A system according to claim 34, wherein the system comprises a database management system providing Virtual Private Database functionality configured to limit database access based on context identifiers associated with model objects.

36. A system according to claim 28, comprising a database trigger configured, in response to the addition of a model object to the database, to set the context identifier for the model object to the currently active context.

37. A system according to claim 28, wherein the database is a relational database, the model objects being stored as rows in one or more database tables, a model object stored as a row having one or more fields for attributes of the model object including a context identifier field.

38. A system according to claim 28, wherein the database hides model objects associated with the currently active context.

39. A computer program product embodied on a non-transitory computer readable medium, comprising:
- computer code for storing a network model representing a first configuration of a communications network;
- computer code for receiving scope information defining a subset of the network model to which changes are to be made;
- computer code for copying model information relating to the defined subset of the network model in accordance with the scope information, to create a partial model copy;
- computer code for modifying the partial model copy to represent a second configuration of the communications network;
- computer code for displaying a user interface for at least one of viewing and modifying network information associated with the communications network, where the user interface is operable in a plurality of contexts, including a first context in which network information relating to the first configuration of the communications network is displayed or modified, and one or more further contexts in which network information corresponding to one or more planned configurations, including the second configuration, of the communications network is displayed or modified, where the user interface provides functionality for switching from a currently active context selected from the plurality of contexts to another of the plurality of contexts; and
- computer code for storing the network information associated with the communications network in a database, where the database associates the network information with context information associated with the plurality of contexts, such that the user interface provides access to view or modify network information associated with the currently active context;
- wherein the database hides model objects associated with one or more contexts from database users;
- wherein the database is configured to prevent database queries relating to model objects from returning, modifying, adding or deleting hidden model objects associated with the one or more contexts.

\* \* \* \* \*

UNITED STATES PATENT AND TRADEMARK OFFICE
CERTIFICATE OF CORRECTION

PATENT NO. : 8,321,548 B2
APPLICATION NO. : 12/412103
DATED : November 27, 2012
INVENTOR(S) : Glendinning et al.

It is certified that error appears in the above-identified patent and that said Letters Patent is hereby corrected as shown below:

In the claims:
Claim 8, col. 31, line 7; please replace "he" with --be--;
Claim 22, col. 31, line 67; please replace "Modifying" with --modifying--.

Signed and Sealed this
Nineteenth Day of March, 2013

Teresa Stanek Rea
*Acting Director of the United States Patent and Trademark Office*